(12) United States Patent
Fujii et al.

(10) Patent No.: US 8,009,195 B2
(45) Date of Patent: Aug. 30, 2011

(54) INFORMATION PROCESSING APPARATUS, INFORMATION PROCESSING SYSTEM, IMAGE INPUT APPARATUS, IMAGE INPUT SYSTEM AND INFORMATION EXCHANGE METHOD FOR MODIFYING A LOOK-UP TABLE

(75) Inventors: Bungo Fujii, Kawasaki (JP); Keita Kimura, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/662,883

(22) Filed: May 10, 2010

(65) Prior Publication Data
US 2010/0253815 A1    Oct. 7, 2010

Related U.S. Application Data

(60) Continuation of application No. 11/505,919, filed on Aug. 18, 2006, now abandoned, which is a division of application No. 09/637,606, filed on Aug. 15, 2000, now abandoned.

(30) Foreign Application Priority Data

Aug. 17, 1999   (JP) ..................................... 11-230711
Aug. 17, 1999   (JP) ..................................... 11-230712
Aug. 17, 1999   (JP) ..................................... 11-230714

(51) Int. Cl.
    *H04N 5/225*   (2006.01)

(52) U.S. Cl. ..................................... 348/207.1; 348/254
(58) Field of Classification Search ............... 348/207.1, 348/207.11, 222.1, 254, 231.1–231.3
See application file for complete search history.

(56) References Cited

U.S. PATENT DOCUMENTS

| | | | |
|---|---|---|---|
| 4,758,883 A | 7/1988 | Kawahara et al. |
| 5,706,457 A | 1/1998 | Dwyer et al. |
| 5,999,213 A | 12/1999 | Tsushima et al. |
| 6,282,330 B1 | 8/2001 | Yokota et al. |
| 6,456,779 B1 | 9/2002 | Saib |
| 6,535,243 B1 | 3/2003 | Tullis |
| 6,686,965 B1 | 2/2004 | Fujii |
| 6,784,925 B1 | 8/2004 | Tomat et al. |
| 6,798,536 B1 | 9/2004 | Muramoto |
| 6,883,140 B1 | 4/2005 | Acker et al. |
| 6,980,233 B1 | 12/2005 | Hirasawa |
| 2005/0259284 A1 | 11/2005 | Tanaka |

FOREIGN PATENT DOCUMENTS

JP   A-02-065374   3/1990

*Primary Examiner* — Nelson D. Hernández Hernández
(74) *Attorney, Agent, or Firm* — Oliff & Berridge, PLC

(57) ABSTRACT

An information processing apparatus includes, an input device that inputs image data output from an electronic camera, a storage device that stores the input image data; and a control device. The image-processing device is capable of modifying the contents of a look-up table in the electronic camera by using a plurality of control points. The information processing apparatus is capable of exchanging the control points and the contents of the look-up table with the electronic camera and the camera is able to store the control points.

21 Claims, 22 Drawing Sheets

FIG. 16A

| HEADER INFORMATION |
| --- |
| SHADOW |
| HIGHLIGHT |
| MINIMUM OUTPUT VALUE |
| MAXIMUM OUTPUT VALUE |
| GAMMA VALUE |
| NUMBER OF SPLINE POINTS n |
| SPLINE POINT 1 COORDINATES (X1, Y1) |
| SPLINE POINT 2 COORDINATES (X2, Y2) |
| ⋮ |
| SPLINE POINT n COORDINATES (Xn, Yn) |

FIG. 16B

| INPUT | OUTPUT |
|-------|--------|
| 0 | 0 |
| 1 | 0 |
| 2 | 1 |
| 3 | 1 |
| 4 | 2 |
| 5 | 2 |
| ... | ... |
| 249 | 252 |
| 250 | 252 |
| 251 | 253 |
| 252 | 254 |
| 253 | 254 |
| 254 | 255 |
| 255 | 255 |

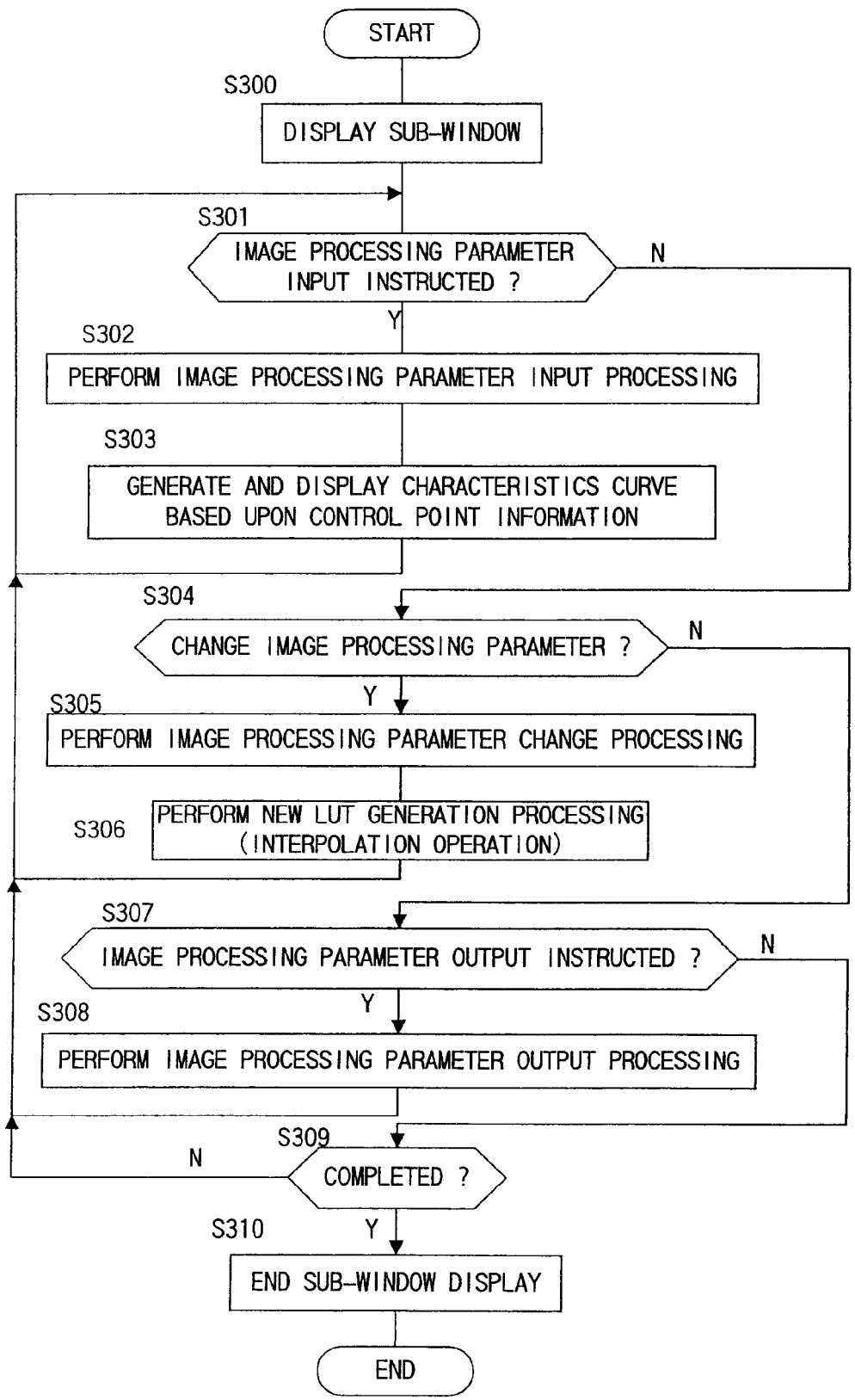

INFORMATION PROCESSING APPARATUS, INFORMATION PROCESSING SYSTEM, IMAGE INPUT APPARATUS, IMAGE INPUT SYSTEM AND INFORMATION EXCHANGE METHOD FOR MODIFYING A LOOK-UP TABLE

INCORPORATION BY REFERENCE

This is a Continuation of application Ser. No. 11/505,919 filed Aug. 18, 2006, which is a Divisional of application Ser. No. 09/637,606 filed Aug. 15, 2000, now abandoned. This application claims the benefit of Japanese Patent Application No. 11-230711 filed Aug. 17, 1999; Japanese Patent Application No. 11-230712 filed Aug. 17, 1999; and Japanese Patent Application No. 11-230714 filed Aug. 17, 1999. The disclosures of the prior applications are incorporated by reference herein in their entirety.

BACKGROUND OF THE INVENTION

1. Field of the Invention

The present invention relates to an information processing apparatus, an information processing system, an information input apparatus, an information input system and an information exchange method. In particular, it relates to a connection of an image input apparatus such as an electronic camera and an image processing apparatus.

2. Description of the Related Art

Some electronic cameras such as digital still cameras are capable of taking photographs while connected to a computer. When a photographing operation is performed with such an electronic camera, the image data obtained through the photographing operation are recorded in a flash memory (volatile memory) internally provided in the electronic camera and are also output to the computer.

The image data output from the electronic camera to the computer are displayed on a display device of the computer.

However, there is a problem in that when attempting a continuous shooting operation in the electronic camera connected to the computer, a significant length of time is required to write the image data into the nonvolatile memory in the electronic camera to result in poor operability due to long intervals elapsing during the continuous shooting operation. In addition, when recording the image data that have been transferred to the computer in a recording device such as a hard disk drive (HDD), the user needs to repeatedly set the drive name, the folder name, the file name and the like for each set of image data and save it.

In the prior art, image data output to a computer from an electronic camera connected to the computer are processed under default processing conditions and are displayed on the display device. If the user finds the image satisfactory he saves the corresponding image data in the hard disk or the like. If, on the other hand, the user decides that the image the display needs to be improved, he changes the processing conditions by adjusting the gradation, adjusting the tone, applying an unsharp mask filter or the like and then saves the data.

However, when sequentially outputting a plurality of images from the electronic camera, the user must go to a great deal of trouble and spend a great deal of time to process and save all the image data output from the electronic camera, as explained below.

After the user saves image data obtained by changing the processing conditions while a given image is displayed on the display, the next set of image data input from the electronic camera is processed under the default processing conditions and is displayed on the display.

For instance, if the photographing conditions are relatively constant, as in studio photography, it is likely that similar processing conditions will be required for a plurality of images obtained through a photographing operation. However, since the processing is implemented under the default processing conditions each time a new set of image data is output, as described above, the user must change the processing conditions every time a new set of image data is input to the computer. As a result, it takes a great deal of time to process and save all the image data output from the electronic camera.

In addition, there are electronic cameras that correct image data by utilizing a look-up table for gradation adjustment (hereafter in this specification, a look-up table is referred to as an "LUT") in order to correct the contrast of image data obtained through photographing. Such an LUT for gradation adjustment is a data table that is referenced in order to ascertain a corrected gradation value corresponding to the gradation value of the image data yet to undergo the adjustment processing.

There are also electronic cameras that allow the contents of the LUT for gradation adjustment to be varied. Such an electronic camera must be connected to a computer when changing the contents of the LUT. A so-called tone curve is displayed on the computer screen to enable the user to set the gradation adjustment characteristics. The user modifies the tone curve to a desired shape by using a mouse or the like. The computer generates an LUT for the gradation adjustment in conformance to the tone curve created as described above, i.e., in conformance to the characteristics curve to be used for the gradation adjustment. This LUT is output from the computer to the electronic camera and is saved in the nonvolatile memory in the electronic camera. Thus, the gradation characteristics of images obtained through a photographing operation performed in the electronic camera can be modified according to user preference.

However, when changing the gradation conversion characteristics of the LUT saved in the electronic camera, it is sometimes difficult to change them as desired for the following reason.

Under normal circumstances, a tone curve is generated by the user plotting a plurality of points (normally several points) on an orthogonal coordinate system through a mouse operation or the like with the plurality of points then interpolated in conformance to a spline curve. Namely, a spline function is generated that expresses a curve passing through the plurality of points, i.e., control points, and the shape of the tone curve is defined by the function. The LUT, which is created based upon the tone curve, is a data table that is referenced in order to ascertain the value of corrected image data corresponding to the value (gradation value) of image data yet to undergo the adjustment processing. For instance, in conjunction with image data with 8-bit gradation, a data table constituted of 256 sets of data corresponding to the 0th gradation through the 255th gradation is saved in the electronic camera.

When changing the gradation conversion characteristics of the LUT saved in the electronic camera, the LUT data saved in the electronic camera are input to the computer and these input data are altered. By displaying the LUT data plotted on the orthogonal coordinate system described above, the gradation conversion characteristics of the LUT saved in the electronic camera can be visualized. However, the data displayed in this manner are obtained by plotting points based upon the 256 sets of data and interpolating these points. In other words, since the information regarding the control points mentioned above is lost, the number and positions of the points (control points) set by the user on the coordinates mentioned above to generate the original tone curve cannot be ascertained. It is extremely difficult to determine the number and positions of these control points from the LUT data.

For the reason explained above, the shape of the new tone curve obtained by the user engaged in an operation to change the shape of the tone curve generated based upon the LUT data read out from the electronic camera may be very different from what the user would expect.

SUMMARY OF THE INVENTION

A first object of the present invention is to provide an information processing apparatus and an information processing system that reduce the length of shooting intervals during a continuous shooting operation performed in, for instance, an electronic camera and allow image data obtained through the photographing operation to be easily saved to a recording device.

A second object of the present invention is to provide an information processing apparatus that is capable of improving the operability when, for instance, inputting and processing data sequentially output from an electronic camera and saving the processed data.

A third object of the present invention is to provide an image processing parameter exchange method, an image input apparatus and an image input system that allow an image processing parameter such as a tone curve, which has already been set, to be modified with ease.

Another object of the present invention is to provide a recording medium that records an information processing program utilized in the apparatus described above and a data signal with which the information processing program is transmitted.

In order to attain the above object, an information processing apparatus according to the present invention comprises: an input device that inputs image data output from an electronic camera; a storage device that stores the input image data; and a control device that sets in advance save conditions under which the input image data are to be saved in the storage device and automatically saves the image data in conformance to the save conditions when the image data has been input.

In this information processing apparatus, it is preferred that the save conditions include information related to a storage location in the storage device, a saved file name and a save format. In this case, it is preferred that the information related to the storage location in the storage device includes information related to a drive name and a folder name in the storage device.

Also, it is preferred that the save conditions include information related to image processing conditions under which the input image data undergo image processing. In this case, it is preferred that the image processing conditions are adopted to process a series of image data output from the electronic camera under a single set of processing conditions. Furthermore, it is preferred that the image processing conditions are set in advance before the electronic camera starts to output the series of image data.

An information processing system according to the present invention comprises: an electronic camera that captures an image of a subject and generates image data; and an image processing apparatus that inputs the image data output from the electronic camera, wherein: the electronic camera outputs the generated image data to the image processing apparatus without recording the generated image data in a nonvolatile storage device internally provided therein or detachably mounted thereto; and the image processing apparatus comprises an input device that inputs the image data output from the electronic camera, a storage device that stores the input image data, and a control device that sets in advance save conditions under which the input image data are to be saved in the storage device and automatically saves the image data in conformance to the save conditions when the image data has been input.

In this information processing system, it is preferred that the save conditions include information related to a storage location in the storage device, a saved file name and a save format.

Also, it is preferred that the save conditions include information related to image processing conditions under which the input image data undergo image processing. In this case, it is preferred that the image processing conditions are adopted to process a series of image data output from the electronic camera under a single set of processing conditions. Furthermore, it is preferred that the image processing conditions are set in advance before the electronic camera starts to output the series of image data.

A recording medium according to the present invention records therein an information processing program for an information processing apparatus that inputs and saves image data output from an electronic camera connected to the information processing apparatus. The information processing program comprises: a first instruction for setting in advance save conditions under which the input image data are saved in a storage device; and a second instruction for automatically saving the image data to the storage device under the save conditions when the image data has been input.

In this recording medium, it is preferred that the first instruction includes an instruction for taking in an input of information related to a storage location in the storage device, a saved file name and a save format constituting the save conditions.

Also, it is preferred that the save conditions include information related to image processing conditions under which the input image data undergo image processing.

A data signal according to the present invention transmits through a communication line and comprises an information processing program for an information processing apparatus that inputs and saves image data output from an electronic camera connected to the information processing apparatus. The information processing program comprises: a first instruction for setting in advance save conditions under which the input image data are saved in a storage device; and a second instruction for automatically saving the image data to the storage device under the save conditions when the image data has been input.

In this data signal, it is preferred that the first instruction includes an instruction for taking in an input of information related to a storage location in the storage device, a saved file name and a save format constituting the save conditions.

Also, it is preferred that the save conditions include information related to image processing conditions under which the input image data undergo image processing.

An information processing apparatus according to the present invention comprises: an input device that sequentially inputs data sequentially output from an electronic camera; a storage device that stores in advance standard processing conditions under which the input data undergo standard processing; a current processing condition setting device that sets in advance current processing conditions under which subsequently input data are to undergo a given type of processing, prior to an input of the subsequently input data; a selection device that can optionally select either one of the standard processing conditions and the current processing conditions prior to the input of the subsequently input data; and a processing device that processes the subsequently input data in conformance to the processing conditions selected by the selection device. In this information processing apparatus, it is preferred that a control device that saves the current processing conditions set by the current processing conditions setting device in the storage device as the standard processing conditions, is further provided. In this case, it is preferred that the control device reinstates contents of the standard processing conditions, which have been replaced with contents of the current processing conditions, in contents of the standard processing conditions originally stored in advance in the storage device, as necessary.

Also, it is preferred that a second storage device that stores data obtained through processing performed under either the standard processing conditions or the current processing conditions, is further provided.

A recording medium according to the present invention records therein an image processing program for an image processing apparatus that inputs and processes data sequentially output from an electronic camera. The image processing program comprises: a first instruction for setting in advance current processing conditions under which subsequently input data are to undergo a given type of processing prior to an input of the subsequently input data; a second instruction for enabling optional selection of either standard processing conditions for implementing standard processing on input data saved in advance in a storage device or the current processing conditions, prior to the input of the subsequently input data; a third instruction for sequentially inputting data sequentially output from the electronic camera; and a fourth instruction for processing the subsequently input data under processing conditions selected by the selection device.

In this recording medium, it is preferred that the information processing program further comprises a fifth instruction for saving to the storage device the current processing conditions set in response to the first instruction as the standard processing conditions.

Also, it is preferred that the information processing program further comprises a sixth instruction for saving to the storage device data having undergone processing performed in response to the forth instruction.

A data signal according to the present invention transmits through a communication line and comprises an information processing program for an information processing device that inputs and processes data sequentially output from an electronic camera. The information processing program comprises: a first instruction for setting in advance current processing conditions under which subsequently input data are to undergo a given type of processing prior to an input of the subsequently input data; a second instruction for enabling optional selection of either standard processing conditions for implementing standard processing on input data saved in advance in a storage device or the current processing conditions, prior to the input of the subsequently input data; a third instruction for sequentially inputting data sequentially output from the electronic camera; and a fourth instruction for processing the subsequently input data under processing conditions selected by the selection device.

A method according to the present invention which exchanges information related to a look-up table referenced in order to obtain a post-adjustment processing image data value corresponding to pre-adjustment processing image data value, comprises: a step of exchanging at least control point information that is referenced when generating a characteristics curve for defining conversion characteristics of the look-up table through an interpolation operation.

An image input apparatus according to the present invention comprises: an image processing device that performs image processing on an input image by referencing a look-up table; a storage device that stores control point information that is referenced when generating a characteristics curve for defining conversion characteristics of the look-up table through an interpolation operation; and a control device that inputs or outputs, at least, the control point information when there is an external request to input or output information related to the look-up table.

An information processing apparatus according to the present invention comprises: a look-up table generating device that generates a characteristics curve for defining conversion characteristics of a look-up table through an interpolation operation by using a plurality of control points; and a control device that outputs, at least, information related to the control points when outputting information related to the look-up table to an image processing device which performs image processing on an input image by referencing the look-up table, and inputs, at least, the information related to the control points when inputting the information related to the look-up table from the image processing device.

In this information processing apparatus, it is preferred that a display device that displays the characteristics curve of the look-up table generated by the look-up table generating device and an input device that takes in an instruction for a characteristics curve shape modification with regard to a characteristics curve displayed on the display device, are further provided; the look-up table generating device generates a characteristics curve of the look-up table for modification based upon the information related to the control points input from the image processing device; the display device displays the characteristics curve of the look-up table for modification that has been generated; the input device takes in an instruction for a characteristics curve shape modification with regard to the characteristics curve of the look-up table for modification; and the control device outputs, a least, information related to control points of a modified characteristics curve when outputting information related to the look-up table having been modified in response to the instruction for a characteristics curve shape modification to the image processing device.

An information input system according to the present invention comprises: an image processing apparatus that generates a look-up table referenced to obtain a post-adjustment processing image data value corresponding to a pre-adjustment processing image data value; and an image input apparatus that performs adjustment processing on image data obtained through an image input by referencing the look-up table, wherein: the information processing apparatus outputs control point information that is referenced when generating a characteristics curve for defining conversion characteristics of the look-up table through an interpolation operation, together with data of the look-up table to the image input apparatus; and the image input apparatus outputs, at least, the control point information among the look-up table data and the control point information to the information processing apparatus.

A recording medium according to the present invention records therein a control program for an image input apparatus. The control program comprises: an instruction for implementing image processing on an input image by referencing a look-up table; and an instruction for inputting or outputting control point information that is referenced when generating a characteristics curve for defining conversion characteristics of the look-up table through an interpolation operation when there is an external request to input or output information related to the look-up table.

A data signal according to the present invention transmits through a communication line and comprises a control program for an image input apparatus. The control program comprises: an instruction for implementing image processing on an input image by referencing a look-up table; and an instruction for inputting or outputting control point information that is referenced when generating a characteristics curve for defining conversion characteristics of the look-up table through an interpolation operation when there is an external request to input or output information related to the look-up table.

A recording medium according to the present invention records therein a control program for an information processing apparatus. The control program comprises: a look-up table generation instruction for generating a characteristics curve for defining conversion characteristics of a look-up table through an interpolation operation by using a plurality of control points; an instruction for outputting, at least, information related to the control points when outputting information related to the look-up table to an image processing device that performs image processing on an input image by referencing the look-up table; and an instruction for inputting, at least, the information related to the control points when inputting the information related to the look-up table from the image processing device.

A data signal according to the present invention transmits through a communication line and comprises a control program for an information processing apparatus. The control program comprises: a look-up table generation instruction for generating a characteristics curve for defining conversion characteristics of a look-up table through an interpolation operation by using a plurality of control points; an instruction for outputting, at least, information related to the control points when outputting information related to the look-up table to an image processing device that performs image processing on an input image by referencing the look-up table; and an instruction for inputting, at least, the information related to the control points when inputting the information related to the look-up table from the image processing device.

BRIEF DESCRIPTION OF THE DRAWINGS

FIGS. 16A and 16B illustrate the data structure of the image processing parameter exchanged between the image processing apparatus and the electronic camera in a third embodiment;

FIG. 20 is a flowchart of the image processing parameter exchange program executed by the CPU internally provided in the image processing apparatus in the third embodiment.

DESCRIPTION OF THE PREFERRED EMBODIMENTS

First Embodiment

Figure 1:
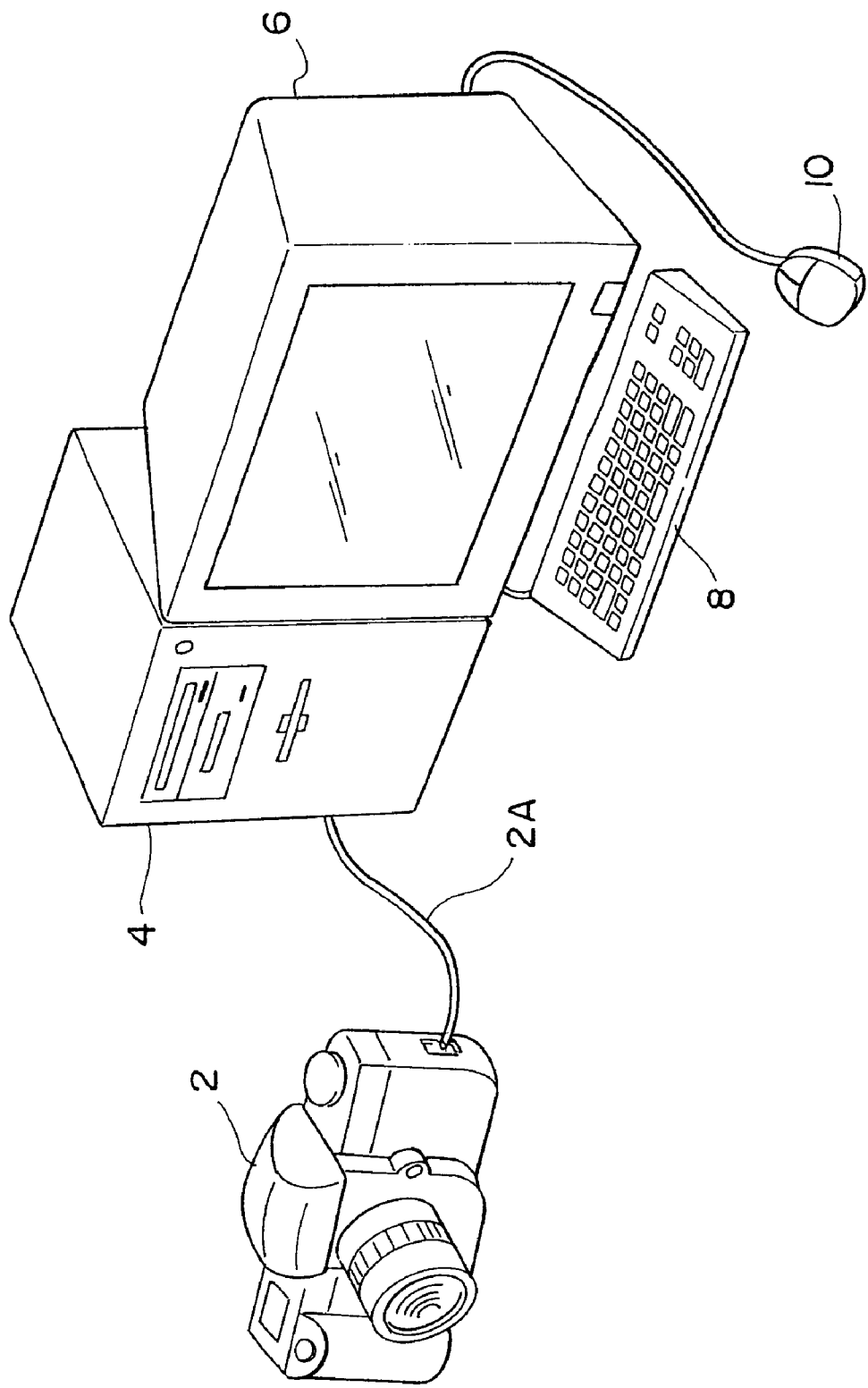
FIG. 1 shows an electronic camera connected to the information processing apparatus in a first embodiment.

FIG. 1 shows an electronic camera connected to the image processing apparatus in the first embodiment. A display 6, a keyboard 8 and a mouse 10 are connected to a computer 4. In FIG. 1, the computer 4, the display 6, the keyboard 8 and the mouse 10 constitute the information processing apparatus in the first embodiment of the present invention. By executing the information processing program which is to be detailed later on the computer 4, an image corresponding to image data transferred from the electronic camera 2 to the computer 4 or image data saved in a hard disk drive or the like in the computer 4 is displayed on the display 6.

The photographer (or the user) performs processing such as a color adjustment or an unsharp mask filter adjustment as necessary while checking the image displayed on the display 6. The image data having undergone the processing are output to a storage device such as a floppy disk, a hard disk or an MO (magneto-optical recording medium) drive to be saved. In addition, it is possible to delete any unnecessary images.

Figure 2:
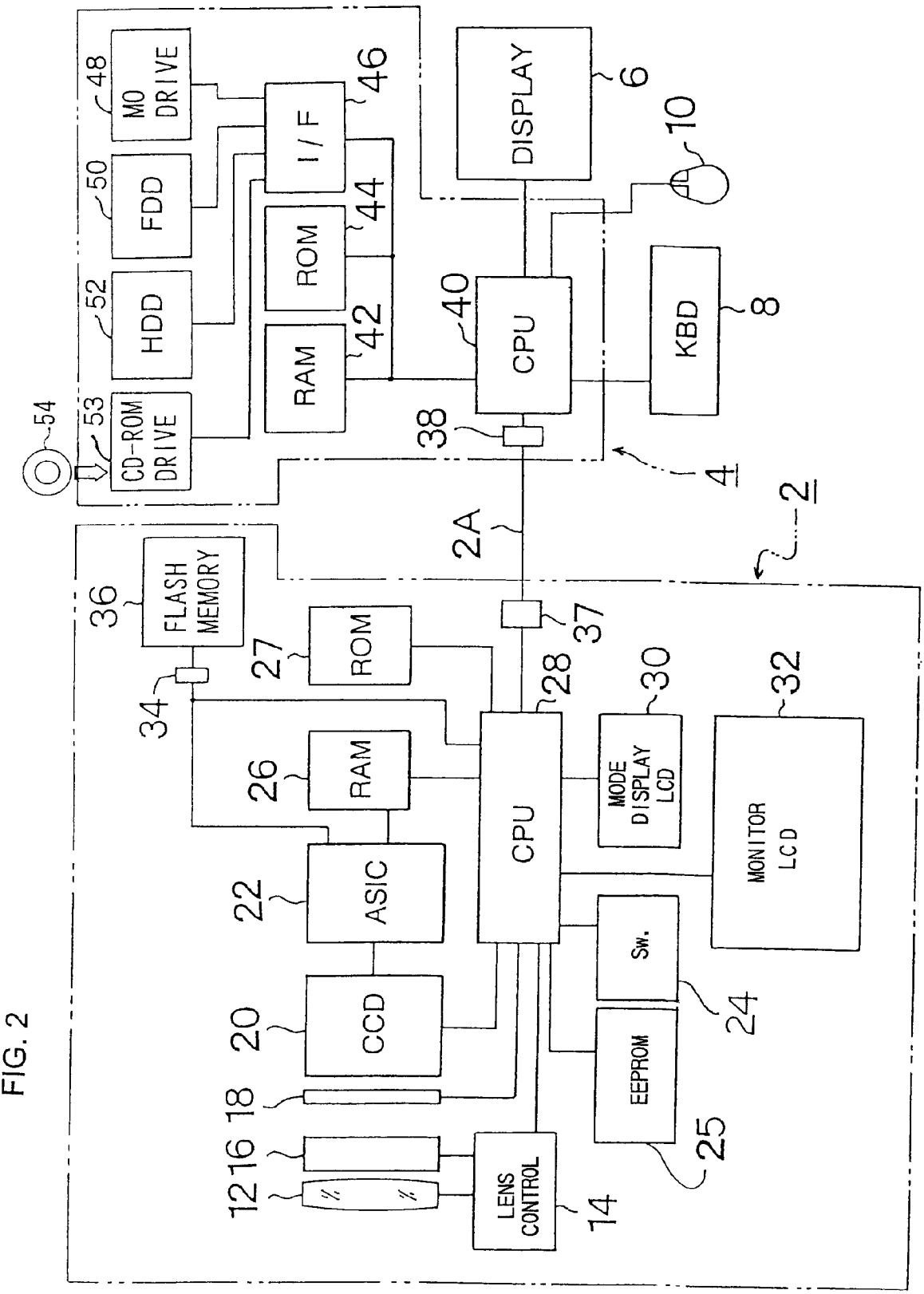
FIG. 2 is a schematic block diagram illustrating the internal structures of the electronic camera and the information processing apparatus in the first embodiment.

FIG. 2 schematically illustrates the internal structures of the electronic camera 2 and the computer 4. The electronic camera 2 and the computer 4 are respectively provided with a connector 37 and a connector 38. One end of a cable 2A is detachably connected to the connector 37, whereas its other end is detachably connected to the connector 38. The structure of the electronic camera 2 is now explained. A lens (a photographic lens) 12 is detachably mounted at the electronic camera 2. In addition, a flash memory 36 which is a nonvolatile storage device constituted as a memory card is detachably connected to the electronic camera 2 via a connector 34. It is to be noted that instead of the flash memory 36, an ultra small hard disk drive constituted as a card, a RAM card backed up by an internal battery or the like may be mounted.

Focusing control of the lens 12 is implemented by a CPU 28 via a lens control unit 14. In addition, an aperture unit 16 constituting an integrated part of the lens 12, too, is controlled by the CPU 28 via the lens control unit 14. The CPU 28 also controls the open/close operation of a shutter 18 so as to allow the shutter 18 to be opened when a CCD 20 receives subject light having been transmitted through the lens 12.

In the figure, a switch 24 represents a group of a plurality of switches, which includes a power switch, a recording/reproduction selector switch, a photographing mode selector switch, an exposure adjustment switch and a shutter release switch.

The photographing mode and the exposure adjustment quantity set through the switch 24, the exposure values set as the shutter speed and the aperture value, the remaining battery power and the like are displayed on a mode display LCD 30. A monitor LCD 32 is utilized for the reproduction of a photographed image, image data histogram display and the like.

When the user performs a shutter release operation, the shutter 18 opens/closes. At this time, the subject light having been transmitted through the lens 12 forms a subject image on the light-receiving surface of the CCD 20. The CCD 20 outputs an image signal corresponding to the subject image to an ASIC 22. A RAM 26 is connected to the ASIC 22. The RAM 26, which is also connected with the CPU 28, can be accessed from the CPU 28. The ASIC 22 generates image data by processing the image signal and temporarily saves the image data in the RAM 26. With the electronic camera 2 and the computer 4 connected as illustrated in FIGS. 1 and 2, the ASIC 22 implements a predetermined type of processing on the temporarily saved image data and outputs the processed data to the computer 4 via the cable 2A. At this time, the image data are not recorded in the flash memory 36. If, on the other hand, the electronic camera 2 is not connected to the computer 4, the ASIC 22 first implements a predetermined type of processing on the image data temporarily saved in the RAM 26 and then records the processed image in the flash memory 36.

The reason the image data are not recorded in the flash memory 36 if the computer 4 is connected to the electronic camera 2 but are recorded in the flash memory 36 if the electronic camera 2 is not connected to the computer 4 is now explained. When the computer 4 is connected with the electronic camera 2, image data are saved in a recording device in the computer 4 and thus, the image data are not recorded in the flash memory 36. While a flash memory does not normally require any electrical power to hold recorded information, its access time is usually longer than that of standard RAM or the like. Especially, with the ever increasing number of pixels at CCD's, the volume of image data increases as well, resulting in the length of time required to write image data in a flash memory sometimes exceeding one second. At the same time, the frame feed speed during a continuous shooting operation may be as high as 10 frames/sec. Thus, by not writing image data into the flash memory 36 if the computer 4 is connected to the electronic camera 2 as described above, the shooting interval during a continuous shooting operation in the electronic camera 2 can be reduced.

The structure of the computer 4 is now explained. A RAM 42 and a ROM 44 are connected to a CPU 40. In addition, a CD-ROM drive 53, a hard disk drive (HDD) 52, a floppy disk drive (FDD) 50, an MO drive 48 and the like are connected to the CPU 40 via an interface (I/F) 46. A CD-ROM 54 is mounted at the CD-ROM drive 53.

The CPU 40 takes in an image signal output by the CPU 28 of the electronic camera 2 and temporarily records it in a temporary area of the RAM 42 or the HDD 52 and, as detailed later, displays thumbnail images, a detailed image, attached information related to the detailed image or the like on the display 6. By operating the mouse 10 and the keyboard 8, the user implements processing such as adjustments of the image data tone and the image data contrast or an unsharp mask filter adjustment. The image data ultimately obtained through the processing (hereafter in the specification, such image data are referred to as "processed image data") are then output to a storage device such as the HDD 52, the FDD 50 or the MO drive 48 and are saved therein.

Figure 3:
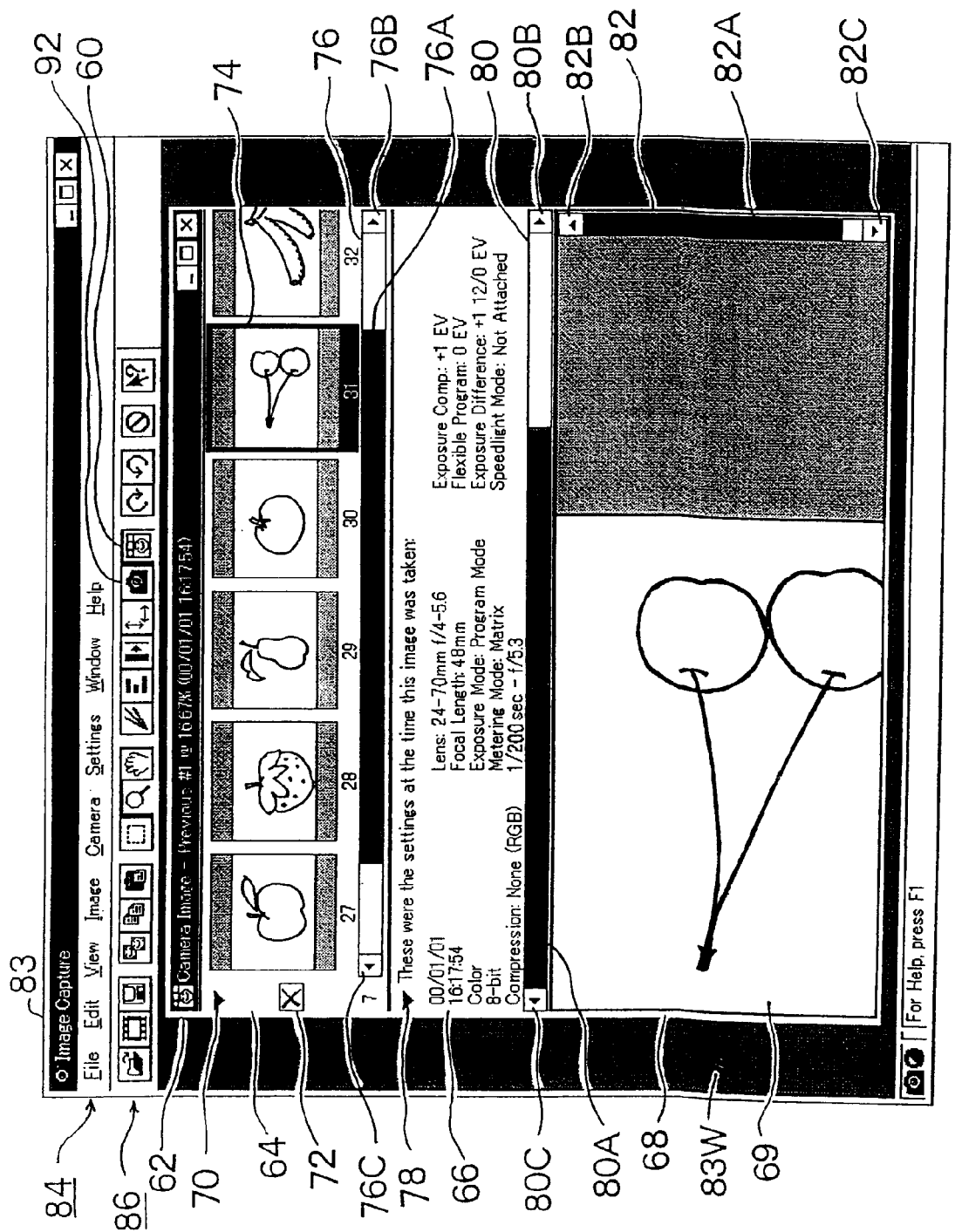
FIG. 3 presents an example of a display screen in the information processing apparatus in the first embodiment.

FIG. 3 shows an example of a screen displayed on the display 6. A window 83 is brought up on the display 6. At this point, nothing is displayed in a display area 83W within the window 83. A list of available functions is displayed in a menu bar 84. In a tool bar 86, a plurality of objects (buttons) that can be selected by using the mouse 10 are displayed. The user operates the mouse 10 to move the cursor onto a camera image button 60 among the objects and then operates a switch provided at the mouse 10 to display a camera image window 62 on the display area 83W. Hereafter in this specification, moving the cursor onto a desired object by operating the mouse 10 and operating the switch provided at the mouse 10 is simply referred to as "clicking." In addition, clicking a single object twice in succession within a relatively short span of time is referred to as "double clicking." Placing the cursor on a desired object and moving the mouse 10 while holding down the switch is referred to as "dragging."

The camera image window 62 is now explained. Display areas falling into three major categories, i.e., a thumbnail image display area 64, an attached information display area 66 and a detailed image display area 68, are provided in the camera image window 62. It is to be noted that while FIG. 3 illustrates a detailed image 69 displayed in the detailed image display area 68 with attached information displayed in the attached information display area 66, no detailed image or attached information is displayed in the detailed image display area 68 or the attached information display area 66 immediately after the camera window 62 is started up.

In the thumbnail image display area 64, thumbnail images corresponding to image data transferred from the electronic camera 2 to the computer 4 are displayed. If there are numerous sets of image data and all the thumbnail images cannot be displayed at once in the thumbnail image display area 64, a scroll bar 76 is displayed at the bottom of the thumbnail image display area 64. As a photographing operation is performed in the camera 2 connected to the computer 4, the image data are transferred to the computer 4 and thumbnail images are added. It is to be noted that a photographing operation of the electronic camera 2 may be achieved either by directly operating the electronic camera 2 or by operating the mouse 10 or the keyboard 8 at the computer 4. A specific example of performing a photographing operation from the computer 4 is explained below. When an object 92 representing a camera icon is clicked on the tool bar 86, a camera control window (not shown) is brought up on the display 6. The user operates the mouse 10 or the keyboard 8 to set the photographing mode and the like in the camera control window and issues a shutter release operation start command.

The user may click a button 76C at the left end or a button 76B at the right end of the scroll bar 76 to scroll the thumbnail images displayed in the thumbnail image display area 64 to the right or to the left in FIG. 3. Likewise, the user may scroll the thumbnail images to the left or to the right in FIG. 3 by dragging a scroll box 76A.

When a desired thumbnail image is clicked, a cursor 74 is displayed around the thumbnail, and thus, the user can verify which thumbnail image has been selected. At this time, a detailed image 69 of the specified image is displayed in the detailed image display area 68, and also, attached information related to the detailed image 69 is displayed in the attached information display area 66. The attached information is constituted of related information which is attached to and recorded with the image data. The attached information may include, for instance, the photographing date, the image data format, the type of lens used for the photographing operation, the exposure mode, the photometering mode, the shutter speed, the aperture value setting, the exposure adjustment quantity, the program curve shift quantity, the difference between the photometering value obtained through the center-weighted light reading and the photometering value obtained through multiple segment exposure metering, whether or not the electronic flash unit has been employed, the setting sensitivity, the white balance mode, the gradation adjustment mode and whether or not edges have been emphasized. If the volume of the attached information is too large to display all the information in the attached information display area 66 at once, a scroll bar 80 is displayed at the bottom of the attached information display area 66. By clicking either a button 80C or 80B located at the left end or the right end of the scroll bar 80, or by dragging a scroll box 80A to the left or to the right in FIG. 3, the user can view specific attached information.

If the detailed image 69 is too large and, as a result, it cannot be displayed in its entirety in the detailed image display area 68, a scroll bar is displayed at the bottom or the right end of the detailed image display area. In the example presented in FIG. 3, in which the detailed image 69 is displayed over its entire width but is not completely displayed along the longitudinal direction, a longitudinal scroll bar 82 is displayed at the right end of the detailed image display area 68.

By clicking a button 82B or 82C at the upper or lower end of the scroll bar 82 or by dragging a scroll box 82A toward the top or the bottom of FIG. 3, the user can view a desired portion of the detailed image 69. The detailed image 69 can be displayed at a desired magnification through an operation of the mouse 10.

The following is an application explanation of an example of the image processing apparatus described above. In studio photographing or the like, the user performs a test photographing operation after setting the illuminating light source and the like. The image data obtained through the test photographing operation are transferred to the computer 4 so that the user can check the results of the test photographing operation on the display 6. The user clicks an object shown in the tool bar 86 while viewing the detailed image 69 to start up the window for performing a desired type of image processing and implements adjustments such as a gradation adjustment, a color tone adjustment and a sharpness adjustment. When the image processing conditions are determined in this manner, the user starts an actual photographing operation.

In the information processing apparatus in this embodiment of the present invention, a series of image data sequentially output from the electronic camera 2 during the actual photographing operation can be processed under the processing conditions determined based upon the test autographing operation results and the image data thus processed can be saved with a preset file name in a preselected save format at a storage location of a preselected folder name at a preselected storage device (drive). In other words, since the series of image data sequentially output from the electronic camera 2 are automatically processed and saved without the user having to engage in any operation of the computer 4 during the actual photographing operation, the user can concentrate on taking photographs. Hereafter in the specification, the processing through which a series of image data sequentially output from the electronic camera 2 are automatically processed and saved is referred to as "Auto Save processing." The storage location where the processed image data are saved through the Auto Save processing may be, for instance, the HDD 52, the FDD 50 or the MO drive 48.

Figure 4:
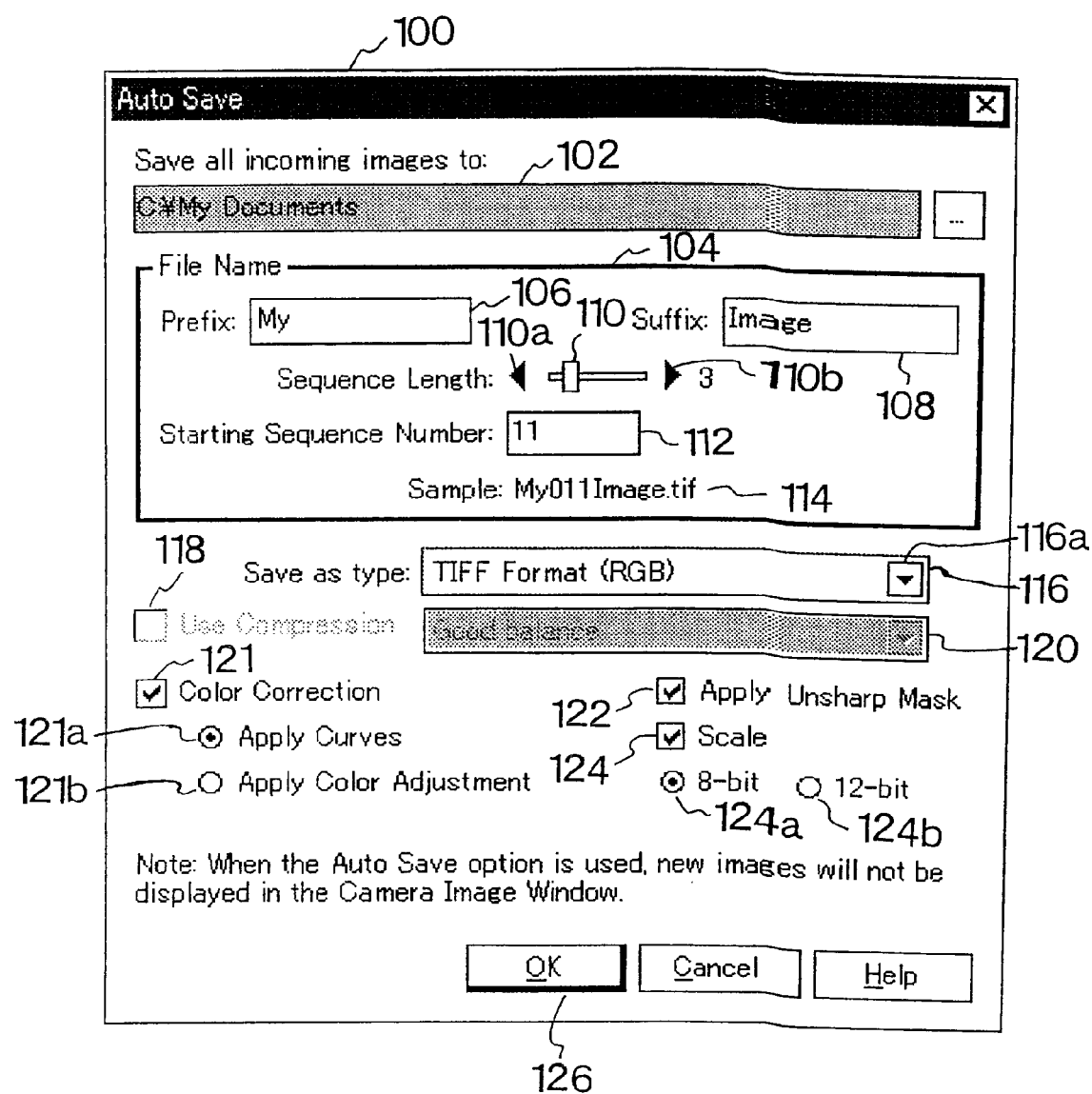
FIG. 4 shows the Auto Save window displayed in the information processing apparatus in the first embodiment.

The following is a detailed explanation of the auto save processing, given in reference to FIGS. 3~10. When an item 85, i.e., "Camera" in the menu bar 84 in the window 83 (see FIG. 3) is clicked, a pull-down menu (not shown) is displayed. By clicking an item "Auto Save" (not shown) in the pull-down menu, an "Auto Save" window 100 shown in FIG. 4 is brought up on the display 6. Hereafter in the specification, this window is referred to as the "Auto Save window 100."

Objects, boxes and the like displayed in the auto-save window 100 are now explained. A box 102 is provided to set the drive name and the folder corresponding to the storage location where image data that have been output from the electronic camera 2 and processed are to be saved. Boxes 106, 108 and 112 displayed in an area 104 are provided to set the file name to be used when the user saves the image data. At the box 106, the prefix, i.e., the leading portion of the file name, is set. At the box 108, the suffix, i.e., the ending portion of the file name, is set. At the box 112, the initial value for the sequential numbers to be assigned when individually saving successive sets of image data is set. The number of digits in the sequential numbers can be modified by dragging an object (slider) 110 to the left or to the right in FIG. 4. Alternatively, the number of digits may be increased/decreased by clicking an object 110a or 110b. The number of digits thus set is displayed on the right side of the object 110b.

In the example presented in FIG. 4, the number of digits is set at three. Since the details of the settings made as described above are displayed in a file name sample display area 114, the user can keep track of all aspects of the file name that has been set with ease.

A box 116 is provided to set the save format for the image data to be saved. The storage formats that may be set include a private save format that enables read/write in this image processing apparatus only and general save formats such as bit map, JPEG and TIFF. When the user clicks a box 116a, a list of the storage formats described above is displayed in a pull-down menu. The user selects a desired save format from this list.

A check box 118 is provided for the user to select whether or not the image data are to be compressed when they are saved. If the check box 118 is clicked, a desired compression rate can be set at a data compression rate setting box 120.

A check box 121 is clicked when the image data output from the electronic camera 2 need to undergo a color adjustment such as a tone curve adjustment or a color tone adjustment. If a user clicks the check box 121, selection of an "Apply Curves" option button 121a and an "Apply Color Adjustment" option button 121b is enabled.

A check box 122 is clicked when the image sharpness needs to be corrected. A check box 124 is clicked when it is necessary to change the resolution (dpi) of the image data and the size of the image. An "8-bit" option button 124a and a "12-bit" option button 124b are provided to set the number of gradations to be used when saving image data.

Now the windows which are brought up on the display 6 when the check boxes 121 and 122 and the option buttons 121a and 121b are clicked among the check boxes and option buttons mentioned above are explained.

Figure 5:
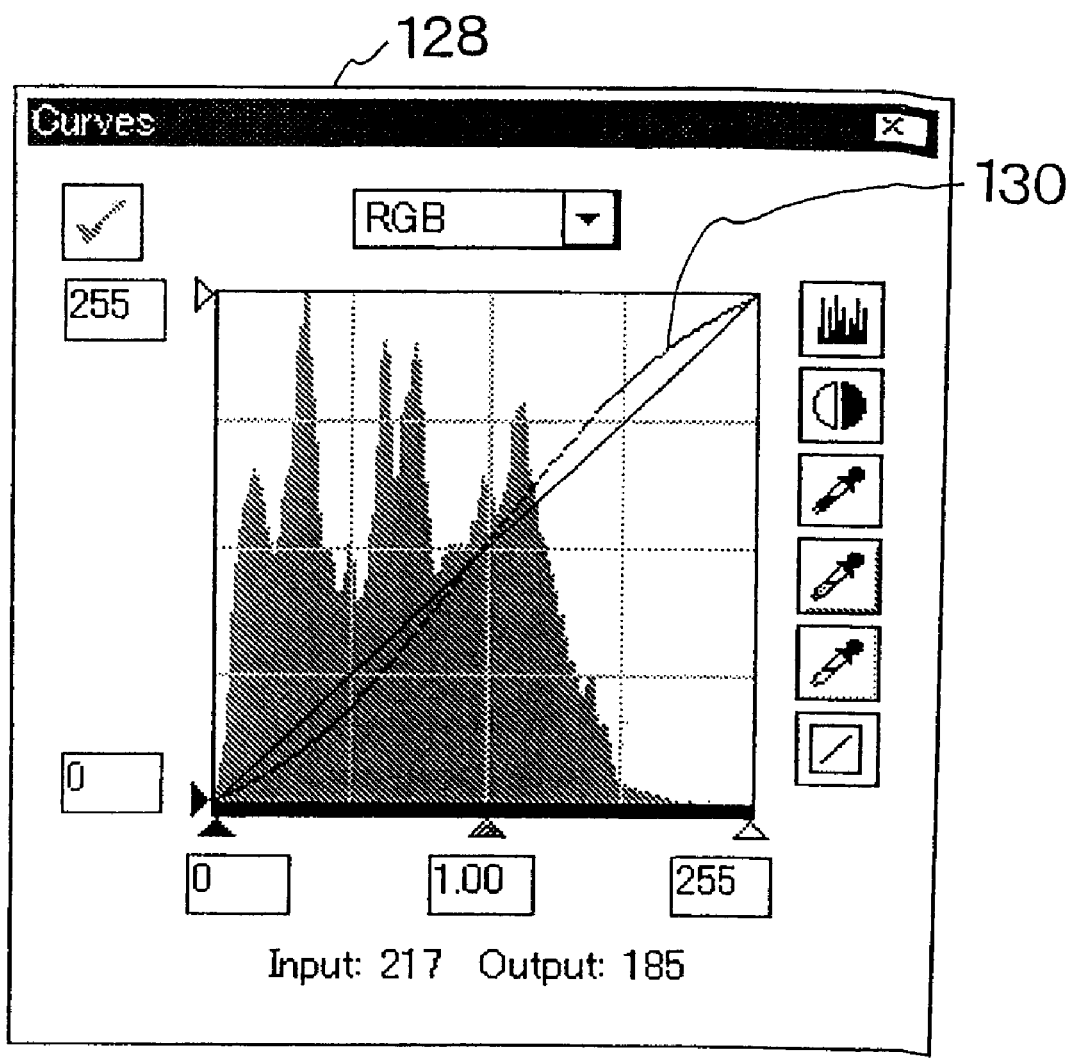
FIG. 5 shows the tone curve window displayed at the information display device in the first embodiment.

When the check box 121 is clicked and checked, and then the option button 121a is clicked and checked in FIG. 4, a tone curve window 128 in FIG. 5 is brought up on the display 6. By operating the keyboard 8 or the mouse 10 while sustaining the tone curve window 128 in an active state, the shape of a tone curve 130 can be modified. By modifying a specific range in the gradations in this manner, the image contrast can be adjusted.

Figure 6:
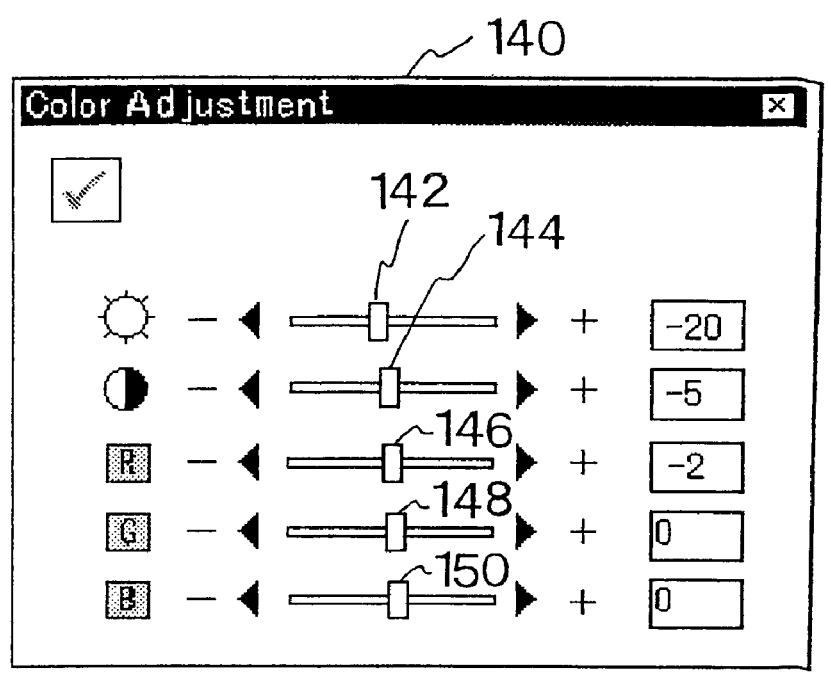
FIG. 6 shows the color adjustment window displayed at the information display device in the first embodiment.

If the check box 121 is clicked and checked and then the option button 121b is clicked and checked in FIG. 4, a color adjustment window 140 shown in FIG. 6 is brought up on the display 6. By dragging objects (sliders) 142, 144, 146, 148 and 150 to the left or to the right in FIG. 6 while sustaining the color adjustment window 140 in an active state, the brightness of the entire image, the contrast and the intensity of red, green and blue can be adjusted.

Figure 7:
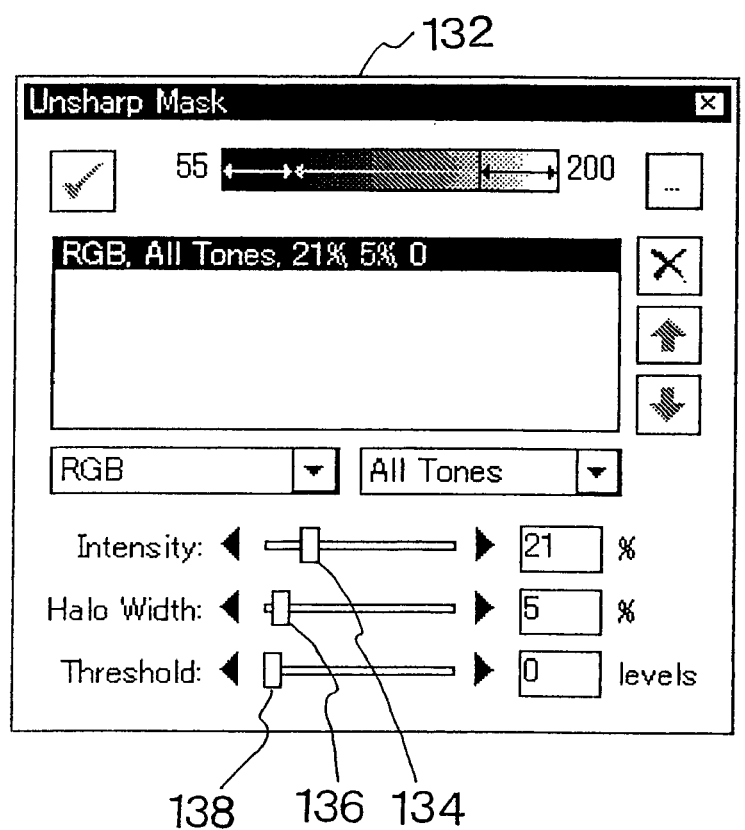
FIG. 7 shows the unsharp mask window displayed at the information display device in the first embodiment.

If the check box 122 shown in FIG. 4 is clicked and checked, an unsharp mask window 132 shown in FIG. 7 is brought up on the display 6. By dragging objects (sliders) 134, 136 and 138 to the left or to the right in FIG. 7 while sustaining the unsharp mask window 132 in an active state, the user can adjust the degree of the effect of the unsharp mask filter.

Figure 8:
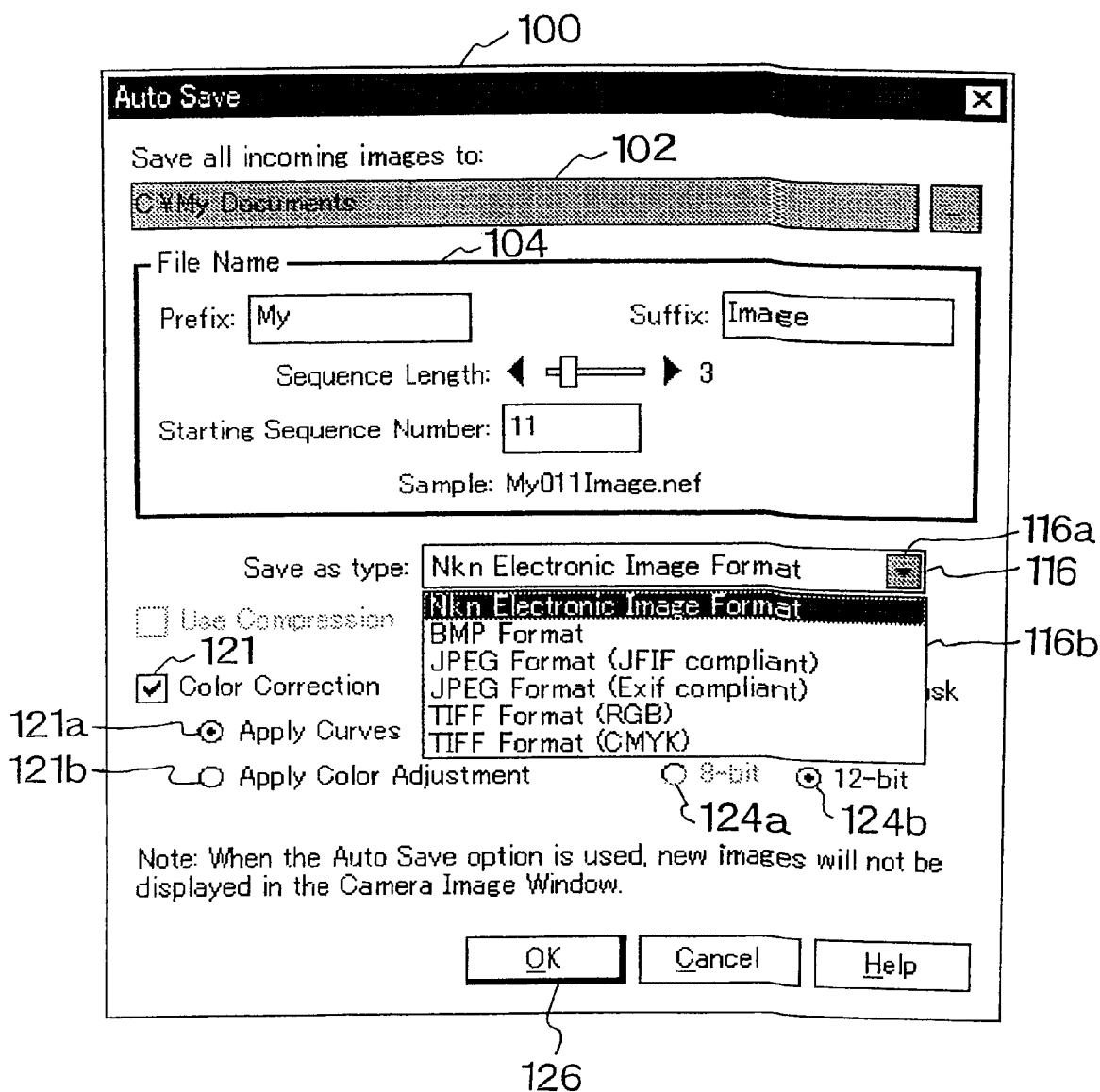
FIG. 8 shows save format options displayed in the Auto Save window displayed in the information display device in the first embodiment.

When the user clicks the button 116a in FIG. 4 after setting desired processing conditions for the image data in the windows explained above, the save format options that can be selected are displayed in a pull-down menu 116b as shown in FIG. 8. In the example presented in FIG. 8, the private save format which allows read/write in this information processing apparatus alone has been selected. Since the image data gradation is fixed at 12 bits in this case, the option button 124a is displayed at low contrast to indicate that the keyboard 8-bit gradation cannot be selected.

Figure 9:
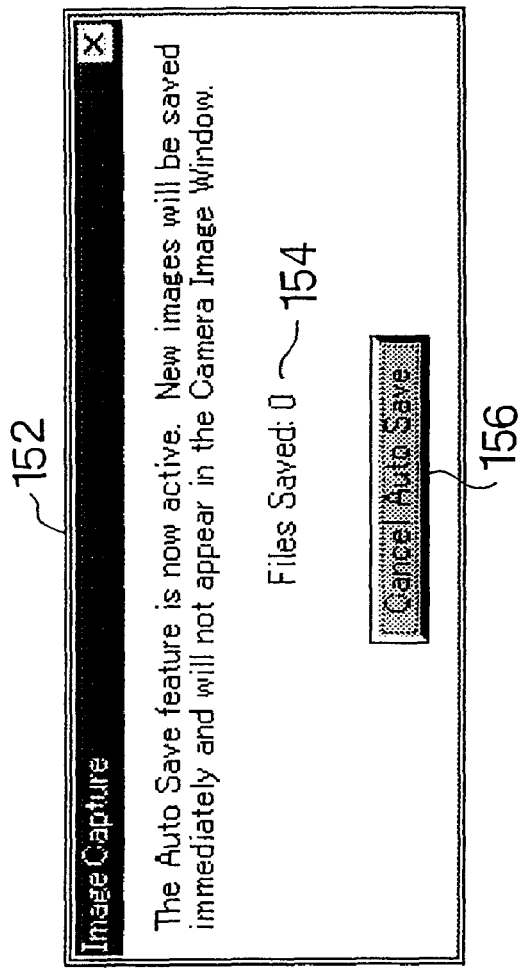
FIG. 9 shows the image signal read window displayed at the information display device in the first embodiment.

By clicking on the "OK" button 126 after setting as described above, an image signal intake window 152 shown in FIG. 9 is brought up on the display 6. The user starts a photographing operation through the keyboard 8 or the mouse 10 of the computer 4 or by directly operating the electronic camera 2. Image data generated through the photographing operation are sequentially transferred from the electronic camera 2 to the computer 4 and the processing, the details of which have been set as described above, is automatically implemented on the image data. Then, the processed image data are sequentially and automatically saved at the storage location set by the user under the file name and in the save format set by the user. The number of sets of image data thus saved is displayed in a display area 154. In the example presented in FIG. 9, "0" is displayed, indicating that a photographing operation (image data processing and storage) has not been performed yet since the image signal intake window 152 was opened. Subsequently, until a "Cancel Auto Save" button 156 is clicked, the automatic processing and the automatic storage of image data described above are repeatedly performed with each individual photographing operation in the electronic camera 2.

Figure 10:
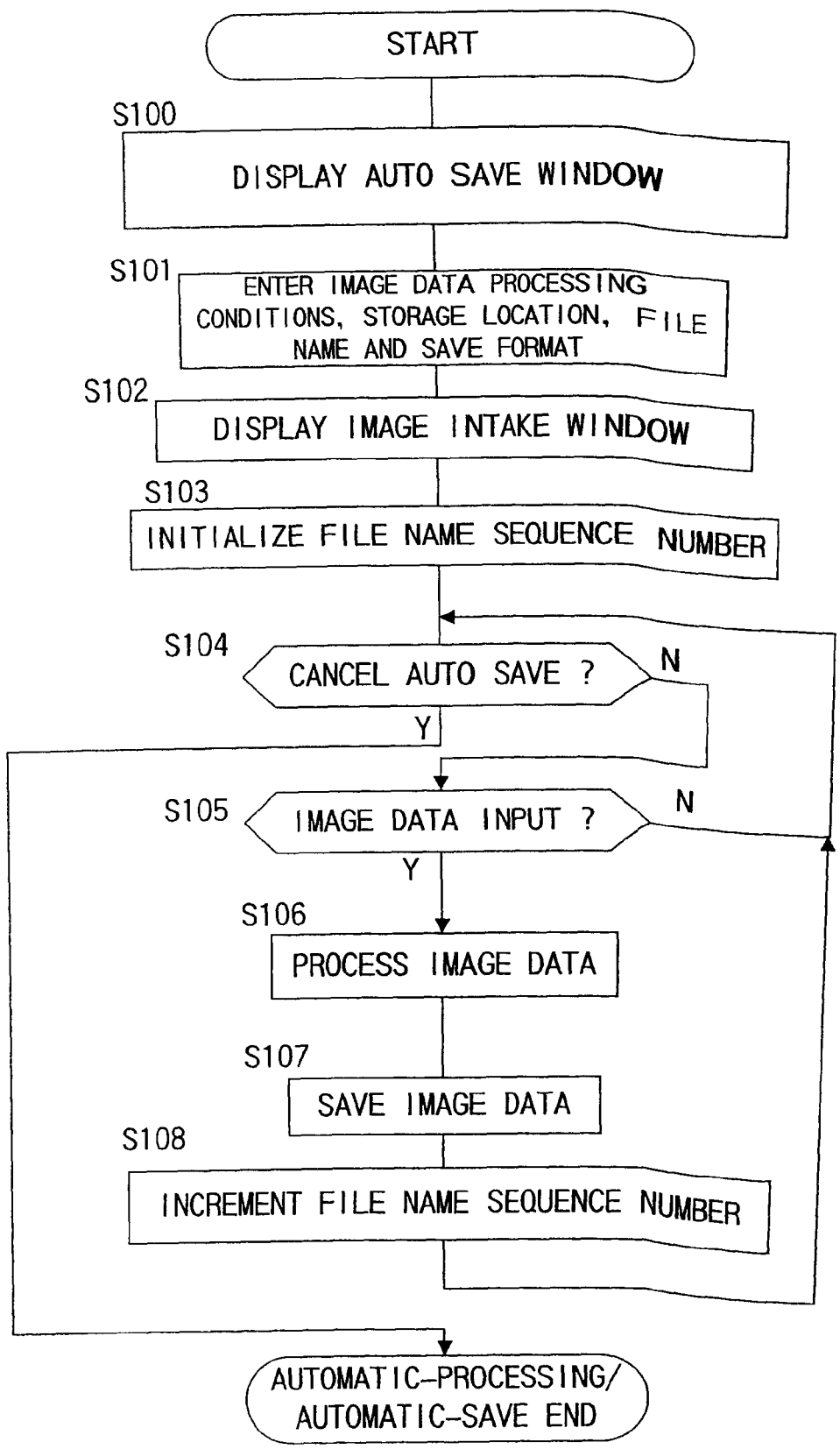
FIG. 10 is a flowchart of the information processing program executed by the CPU internally provided in the information processing apparatus in the first embodiment.

FIG. 10 is a schematic flowchart of the information processing program used to execute the information processing described above on the computer 4. With the information processing program in FIG. 10 executed by the CPU 40 in the computer 4, the information processing described above is implemented. This program, which is recorded (saved) in a recording medium (storage medium) such as the CD-ROM 54 or a floppy disk, is normally pre-installed in the hard disk drive 52 prior to the execution of the program by the CPU 40. Alternatively, the information processing program may be written in the ROM 44, an EEPROM (not shown) or the like. In addition, part of, or the entirety of the information processing program may be loaded from another computer or the like connected via a communication line or through a network, or part or the entirety of the information processing program may be down-loaded via the Internet or the like.

Figure 21:
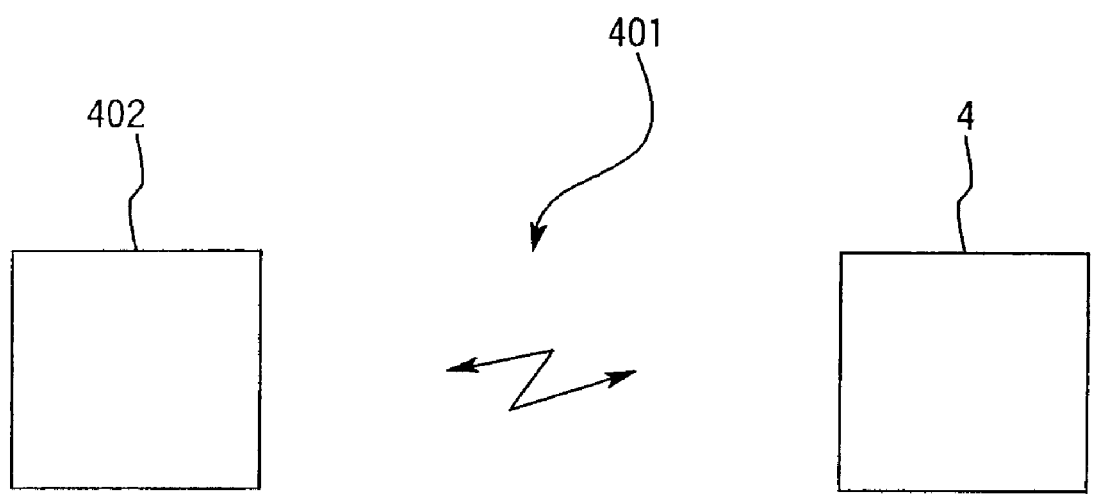
FIG. 21 is a schematic diagram illustrating two computers connected via a communication line.

The recording medium in which the program is recorded may be constituted of any of other various types of recording media including magnetic tape and a DVD instead of a CD-ROM or a floppy disk. The structure illustrated in FIG. 21 may be assumed to provide a program through the Internet or the like. In FIG. 21, the computer 4 is the computer explained earlier and has a function of connecting with a communication line 401. A computer 402, which is a server computer that provides the program, has the information processing program saved therein. The communication line 401 may be a communication line for connecting with the Internet or for personal computer communication or it may be a dedicated communication line. The communication line 401 may be a telephone line or a wireless telephone line such as a line for a mobile telephone. By assuming the structure illustrated in FIG. 21, the information processing program is converted to a signal to be transmitted through a transmission medium such as the communication line 401 and is transmitted. The programs used in other embodiments to be detailed later, too, can be transmitted in a similar manner.

The information processing program executed as shown in the flowchart in FIG. 10 is explained by referring to FIGS. 3~9 as necessary. This information processing program is started up by the operator by clicking the item "Camera" 85 in the menu bar 84 to display the pull-down menu and then clicking the item "Auto Save" (not shown) after the window 83 in FIG. 3 is brought up on display.

In step S100, the CPU 40 engages in the processing for displaying the Auto Save window 100 shown in FIG. 4. In step S101, the CPU 40 takes in the image data processing conditions and other conditions such as the storage location, the file name and the save format, as explained earlier in reference to FIGS. 4~8. Then, when the CPU 40 verifies that the "OK" button 126 has been clicked, the operation proceeds to step S102.

In step S102, the CPU 40 brings up the image signal intake window 152 shown in FIG. 9 on the display 6. The CPU 40 then initializes the file name sequential number in step S103. In other words, based upon the value set at the box 112 in FIG. 4, the CPU 40 sets the initial value of the sequential number in the file name.

In step S104, the CPU 40 makes a decision as to whether or not the Auto Save has been canceled. Namely, the CPU 40 makes a decision in step S104 as to whether not the button 156 in FIG. 9 has been clicked, and if an affirmative decision is made, the processing for automatically processing and saving image data shown in FIG. 10 ends. In such a case, the image signal intake window 152 in FIG. 9 is closed. If, on the other hand, a negative decision is made in step S104, the CPU 40 proceeds to step S105 to make a decision as to whether or not image data have been input from the electronic camera 2. If a negative decision is made in step S105, the processing performed by the CPU 40 returns to step S104 to repeat the processing described above. If, on the other hand, an affirmative decision is made in step S105, the CPU 40 proceeds to step S106.

In step S106, the CPU 40 processes the image data input from the electronic camera 2 under the processing conditions input in step S101. In step S107, the CPU 40 saves the processed image data at the storage location under the folder name input in step S101 in the storage device selected in step S101 in the save format input in step S101.

In step S108, the CPU 40 increments the sequential number in the file name in preparation for saving the next set of image data and then returns to step S104. Thus, when a photographing operation is performed in the electronic camera 2, the image data are output to the computer 4 where they are automatically processed and automatically saved by the computer 4. During this process, a series of image data output by the electronic camera 2 is processed under the same processing conditions that have been set in advance prior to the start of the photographing operation. In addition, the storage location where the image data are to be saved, the file name and the save format, too, are set in advance prior to the photographing operation.

This allows the user to concentrate on the actual photographing operation since he does not need to set the image data processing conditions, the storage location, the file name, the save format and the like for each set of image data. In addition, when image data are transferred from the electronic camera 2 to the computer 4, the image data are not recorded in the flash memory 36 mounted at the electronic camera 2. Consequently, since time is saved by not recording the image data into the flash memory 36, the frame feed speed during a continuous shooting operation can be increased at the electronic camera 2.

It is to be noted that by increasing the capacity of the RAM 26 internally provided at the electronic camera 2, the frame feed speed during a continuous shooting operation can be increased in the following manner. Namely, when the shutter release button is held down continuously with the electronic camera 2 set in the continuous shooting mode, the speed at which image data generated at the electronic camera 2 increases may exceed the speed at which they are processed and saved at the computer 4. This may be due to image data not being processed at the computer 4 as fast as they are generated at the electronic camera 2 or due to image data not being transferred from the electronic camera 2 to the computer 4 as fast as they are generated at the electronic camera 2. In either case, by temporarily saving the image data in the RAM 26 of the electronic camera 2, the frame feed speed can be increased. The image data transfer from the electronic camera 2 to the computer 4 may be temporarily interrupted and then a series of image data may be output all at once to the computer after the photographing operation generating the series of image data ceases. Alternatively, the photographing operation and the image data transfer operation may be implemented in parallel and only image data overflowing at the electronic camera 2 due to the low transfer speed or the low processing speed at the computer 4 may be temporarily recorded in the RAM 26.

In addition, while an explanation is given above on an example in which image data are automatically processed and automatically saved as described above when the electronic camera 2 and the computer 4 are connected with each other via the cable 2A, the present invention is not limited to this example. For instance, a photographing operation may be performed with a standalone electronic camera 2, with the image data generated through the photographing operation saved in the RAM 26, the flash memory 36 or the like. Then, when the photographing operation through which a series of image data is generated ends, the electronic camera 2 and the computer 4 should be connected with each other to transfer the image data in the RAM 26 or the like to the computer 4. In addition, instead of utilizing the cable 2A, image data may be transferred from the electronic camera 2 to the computer 4 through light, radio waves or the like. Since this frees the user from other restrictions such as the length of the cable 2A and the layout of the cable 2A, the user is enabled to take pictures with a higher degree of freedom. According to the present invention, the electronic camera 2 and the computer 4 can also be regarded as being "connected with each other" when the electronic camera 2 and the computer 4 are in a state in which they can exchange information wirelessly in this manner.

While an explanation is given above on an example in which the present invention is adopted in studio photographing, it may be adopted in outdoor photographing. For instance, the blooming process of a plant may be recorded through time-lapse photography. In such an application, since it is highly likely that the photographing operation is implemented over a great length of time, the color temperature of the sunlight may change. Accordingly, the color adjustment conditions may be pre-programmed to automatically change in correspondence to the individual photographing time points. In other words, instead of implementing the same processing on a series of image data to be saved, image data may be processed and saved sequentially with the processing details varied in conformance to a plurality of processing procedures that are input in advance. In the latter case, the processing may be programmed so as to vary the storage location, the file name and the save format for the different sets of image data.

An explanation is given above on an example in which the user sets the processing conditions, the storage location, the file name and the save format prior to a photographing operation and the computer 4 (the CPU 40) inputs (verifies) these settings. Instead, information related to the processing conditions and the like described above may be pre-saved in the HDD 52 or the like and may be input to the CPU 40 from the HDD 52 or the like. Alternatively, the processing conditions and the like may be set on the electronic camera 2 by the user by operating the electronic camera 2 and may be output to the computer 4 prior to the output of image data.

The electronic camera 2 connected to the computer 4 may be a movie camera instead of the still camera described above. When a movie camera is connected to the computer 4, dynamic image data are output from the electronic camera 2 to the computer 4. A single series of the image data generated during the period of time elapsing from the photographing operation start to the photographing operation stop is saved under a single file name.

Second Embodiment

Since the electronic camera is connected to the information processing apparatus in the second embodiment as shown in FIG. 1 which illustrates the first embodiment, its illustration is omitted.

In FIG. 1, a display 6, a keyboard 8 and a mouse 10 are connected to a computer 4. The computer 4 and the display 6 constitute the information processing apparatus in the embodiment. By executing the information processing program which is to be detailed later in the computer 4, a specific type of processing is implemented on image data output from the electronic camera 2 to the computer 4 and the corresponding image is displayed on the display 6.

The user performs processing such as color adjustment or an unsharp mask filter adjustment as necessary while checking the image displayed on the display 6 and saves the processed image data into an auxiliary storage device such as a floppy disk, a hard disk or a magneto-optical recording medium (MO). In addition, it is possible to delete any unnecessary images.

Since the internal structures of the electronic camera 2 and the computer 4 are as shown in FIG. 2 illustrating the first embodiment, their illustration is omitted.

In FIG. 2, the electronic camera 2 and the computer 4 are respectively provided with a connector 37 and a connector 38. One end of a cable 2A is detachably connected to the connector 37, whereas its other end is detachably connected to the connector 38. It is to be noted that instead of using the cable 2A, information may be exchanged between the electronic camera 2 and the computer 4 via light, radio waves or the like.

The structure of the electronic camera 2 is now explained. A lens 12 is detachably mounted at the electronic camera 2. In addition, a flash memory 36 constituted as a memory card is detachably connected to the electronic camera 2 via a connector 34. It is to be noted that instead of the flash memory 36, an ultra small hard disk drive constituted as a card or the like may be mounted.

Focusing control of the lens 12 is implemented by a CPU 28 via a lens control unit 14. In addition, an aperture unit 16 constituting an integrated part of the lens 12, too, is controlled by the CPU 28 via the control unit 14. The CPU 28 also controls the open/close operation of a shutter 18 so as to allow the shutter 18 to be opened when a CCD 20 receives subject light having been transmitted through the lens 12.

In the figure, a switch 24 represents a group of a plurality of switches, which includes a power switch, a recording/reproduction selector switch, a photographing mode selector switch, an exposure adjustment switch and a shutter release switch.

An EEPROM 25 is provided to record adjustment constants used during the production of the electronic camera 2, status information indicating the statuses during operation of the electronic camera 2 and the like. It is to be noted that volatile memory such as an SRAM, connected with a backup battery, may be utilized instead of the EEPROM 25. In such a structure, the power for holding memory contents will normally be supplied to the volatile memory from a battery or the like installed in the electronic camera 2. If no battery is mounted, the power for holding the memory contents such as adjustment constants and the like will be supplied to the volatile memory from the backup battery.

The photographing mode and the exposure adjustment quantity set through the switch 24, the exposure values set as the shutter speed and the aperture value, the remaining battery power and the like are displayed on a mode display LCD 30. A monitor LCD 32 is utilized for the reproduction of a photographed image, image data histogram display and the like.

When the user performs a shutter release operation, the shutter 18 opens/closes. At this time, the subject light having been transmitted through the lens 12 forms a subject image on the light-receiving surface of the CCD 20. The CCD 20 outputs an image signal corresponding to the subject image to an ASIC 22. The RAM 26 is connected to the ASIC 22. A RAM 26, which is connected with the CPU 28, can be also accessed from the CPU 28. The ASIC 22 generates image data by processing the image signal and temporarily saves the image data in the RAM 26. The ASIC 22 implements a predetermined type of processing on the temporarily recorded image data and records the processed image in the flash memory 36.

When the electronic camera 2 is set in the reproduction mode, the image data recorded in the flash memory 36 are read into the RAM 26 by the ASIC 22. The CPU 28 displays an image corresponding to the image data in the RAM 26 on the monitor LCD 32.

The structure of the computer 4 is now explained. A RAM 42 and a ROM 44 are connected to a CPU 40. In addition, a CD-ROM drive 53, a hard disk drive (HDD) 52, a floppy disk drive (FDD) 50, an MO drive 48 and the like are connected to the CPU 40 via an interface (I/F) 46.

The CPU 40 takes in image data output from the electronic camera 2 and processes the image data under preset processing conditions. The processing implemented on the image data includes a gradation adjustment, a color tone adjustment and an unsharp mask filter adjustment. The processing conditions under which the processing is performed by the CPU 40 can be freely set by the user as detailed later. Image data may be output from the electronic camera 2 to the computer 4 under the following two sets of circumstances. Namely, image data obtained through a photographing operation performed while the electronic camera 2 is disconnected from the computer 4 are recorded in the flash memory 36 and after the photographing operation is completed, the electronic camera 2 and the computer 4 are connected to each other to allow the image data to be output from the electronic camera 2, or image data generated in the electronic camera 2 through a photographing operation performed while the electronic camera 2 and the computer 4 are connected to each other are output to the computer 4 in real time.

The CPU 40 temporarily records the image data having undergone the processing described above in a temporary area in the RAM 42 or in the HDD 52 and displays thumbnail images, a detailed image and attached information related to the detailed image on the display 6 as explained later.

The user may operate the mouse 10 or the keyboard 8 to change the processing conditions under which processing such as an image data color tone adjustment, an image data gradation adjustment or an unsharp mask filter adjustment is performed as necessary. In other words, while the CPU 40 implements the processing on the image data output from the CPU 28 of the electronic camera 2 under the preset processing conditions as described above, the user is able to change the processing conditions if they prove to be unsatisfactory. The image data that are ultimately obtained through the processing (hereafter in the specification, these image data are referred to as "processed image data") are output to and saved at an auxiliary storage device such as the HDD 52, the FDD 50 or the MO drive 48.

An example of a screen displayed on the display 6 as the information processing program in the second embodiment which is to be detailed later is executed in the computer 4 is explained in reference to FIG. 3 illustrating the first embodiment.

As the execution of the information processing program starts, a window 83 is displayed. At this point, nothing is displayed in a display area 83W within the window 83. A list of available functions is displayed in a menu bar 84. In a tool bar 86, a plurality of objects (buttons) that can be selected by using the mouse 10 are displayed. The user operates the mouse 10 to move the cursor onto a camera image button 60 among the objects and then operates a switch provided at the mouse 10 to display a camera image window 62 on the display area 83W. Hereafter in this specification, moving the cursor onto a desired object by operating the mouse 10 and operating the switch provided at the mouse 10 is simply referred to as "clicking." In addition, clicking a single object twice in succession within a relatively short span of time is referred to as "double clicking." Placing the cursor on a desired object and moving the mouse 10 while holding down the switch is referred to as "dragging."

The camera image window 62 is now explained. Display areas falling into three major categories, i.e., a thumbnail image display area 64, an attached information display area 66 and a detailed image display area 68, are provided in the camera image window 62. It is to be noted that while FIG. 3 illustrates a detailed image 69 displayed in the detailed image display area 68 with attached information displayed in the attached information display area 66, neither a detailed image nor attached information is displayed in the detailed image display area 68 and the attached information display area 66 immediately after the camera window 62 is started up.

In the thumbnail image display area 64, thumbnail images corresponding to image data output from the electronic camera 2 to the computer 4 are displayed. If there are numerous sets of image data and all the thumbnail images cannot be displayed at once in the thumbnail image display area 64, a scroll bar 76 is displayed at the bottom of the thumbnail image display area 64. As image data are sequentially output to the computer 4 from the electronic camera 2 connected to the computer 4, new thumbnail images are added onto the display.

The user may click a button 76C at the left end or a button 76B at the right end of the scroll bar 76 to scroll the thumbnail images displayed in the thumbnail image display area 64 to the right or to the left in FIG. 3. Likewise, the user may scroll the thumbnail images to the left or to the right in FIG. 3 by dragging a scroll box 76A.

When a desired thumbnail image is clicked, a cursor 74 is displayed around the thumbnail, and thus, the user can verify which thumbnail image has been selected. At this time, a detailed image 69 of the specified image is displayed in the detailed image display area 68, and also, attached information related to the detailed image 69 is displayed in the attached information display area 66. If the volume of the attached information is too large to display all the information in the attached information display area 66 at once, a scroll bar 80 is displayed at the bottom of the attached information display area 66. By clicking either a button 80C or 80B located at the left end or the right end of the scroll bar 80, or by dragging a scroll box 80A to the left or to the right in FIG. 3, the user can view specific attached information.

If the detailed image 69 is too large and, as a result, cannot be displayed in its entirety in the detailed image display area 68, a scroll bar is displayed at the bottom or the right end of the detailed image display area. In the example presented in FIG. 3, in which the detailed image 69 is displayed over its entire width but is not completely displayed along the longitudinal direction, a longitudinal scroll bar 82 is displayed at the right end of the detailed image display area 68. By clicking a button 82B or 82C at the upper or lower end of the scroll bar 82 or by dragging a scroll box 82A toward the top or the bottom of FIG. 3, the user can view a desired portion of the detailed image 69. The detailed image 69 can be displayed at a desired magnification through an operation of the mouse 10.

The detailed image 69 displayed in the detailed image display area 68 is obtained through the predetermined type of processing performed by the CPU 40 on the image data output from the electronic camera 2 as explained earlier. The user observes the detailed image 69 and if he is satisfied with the image quality, he issues a command to the computer 4 to output/save the processed image data to/at an auxiliary storage device such as the HDD 52, the FDD 50 or the MO drive 48. If, on the other hand, the quality of the detailed image 69 is not satisfactory, the user engages in an operation to change the processing conditions as detailed below. The following explanation is given on an example in which the user changes the processing conditions under which a gradation (tone curve) adjustment and an unsharp mask filter adjustment are performed.

Figure 11:
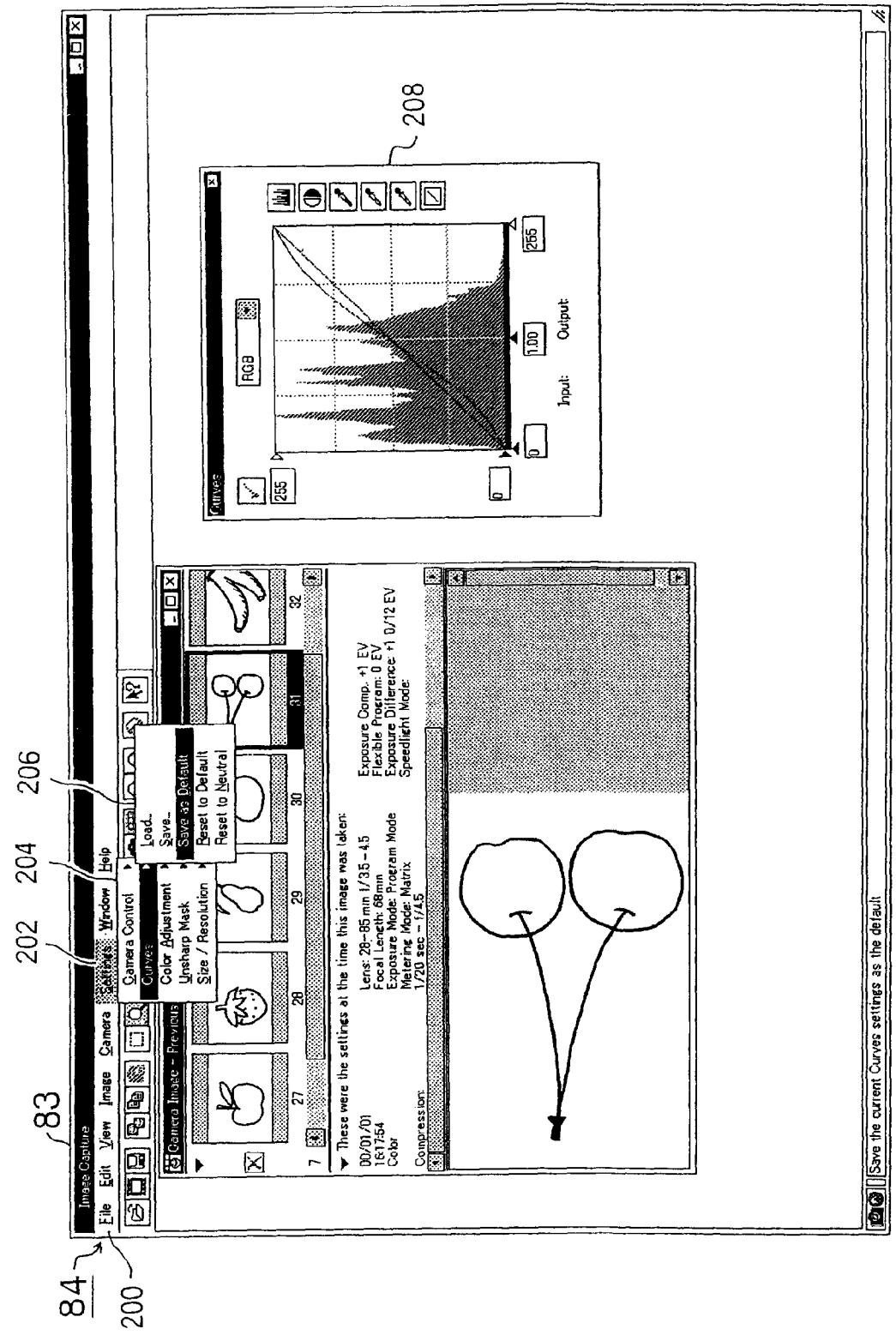
FIG. 11 shows a sub-window displayed to enable modification of the tone curve setting in a second embodiment.

In FIG. 11, a tone curve window 208 for changing the tone curve setting conditions is displayed in the window 83. The display areas of pull-down menus 204 and 206 in FIG. 11 are shown in an enlargement in FIG. 13A.

Figure 13A:
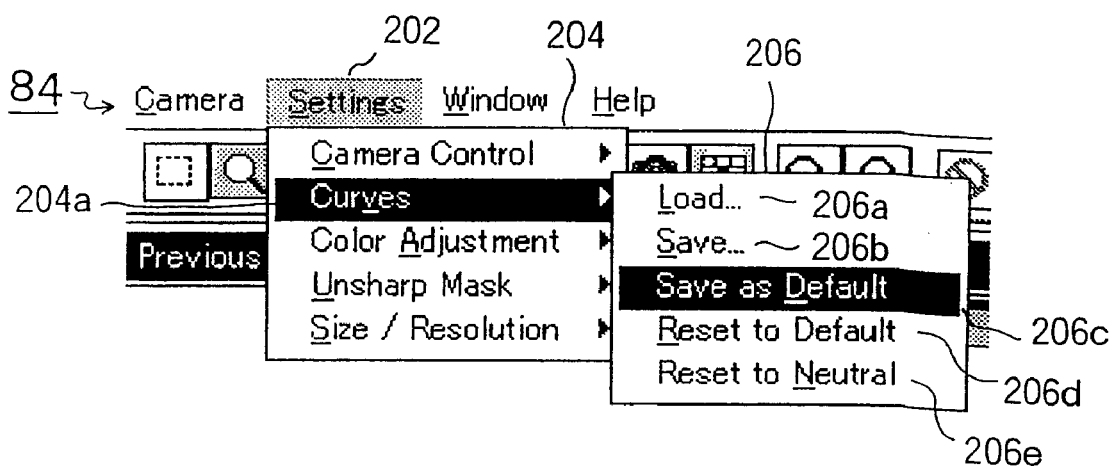
FIG. 13A shows in an enlargement the pull-down menu displayed in the screen shown in FIG. 11.

In FIG. 13A, by clicking an item "Settings" 202 in the menu bar 84, the pull-down menu 204 is displayed. The pull-down menu 206 is brought up on display by placing the cursor on an item "Curves" 204a in the pull-down menu 204. When an item "Load" 206a in the pull-down menu 206 is clicked, the tone curve parameter setting saved in the HDD 52 (see FIG. 2) or the like is read out and the tone curve corresponding to the parameter setting and the parameter setting are displayed in the tone curve window 208 in FIG. 11. By dragging an object displayed in the tone curve window 208 or by entering a new numerical value after clicking a box in which a numerical value is displayed, the user can change the tone curve setting. Hereafter in the specification, conditions that are newly set by the user by changing a setting as described above or by reading out a pre-saved setting are to be referred to as the "current conditions."

The user may save the tone curve parameter setting thus modified by assigning a desired file name. In such a case, by clicking an item "Save" 206b in the pull-down menu 206 in FIG. 13A, a window (not shown) for saving the tone curve parameter setting is brought up on display. In addition, the user may save the modified tone curve parameter setting as a new default value. In this case, he only needs to click an item "Save as Default" 206c in the pull-down menu 206 in FIG. 13A.

If it becomes necessary to reset the tone curve to the default setting, the user needs to click an item "Reset Default" 206d in the pull-down menu 206. Likewise, if it becomes necessary to reset the tone curve setting to the original factory setting, the user clicks an item "Reset to Neutral" 206e in the pull-down menu 206. It is to be noted that the term "default" as referred to in the embodiments of the present invention is roughly synonymous with "a standard state set in accordance with a user preference." For instance, by assigning the processing conditions most frequently used by the user as the "default" setting, the operation can return to the standard state immediately after completing processing performed under different processing conditions by resetting to the "default" setting. In other words, the information processing apparatus in this embodiment allows the current processing conditions to be reset to the standard processing conditions or to the original factory conditions without requiring a complicated operation.

Figure 12:
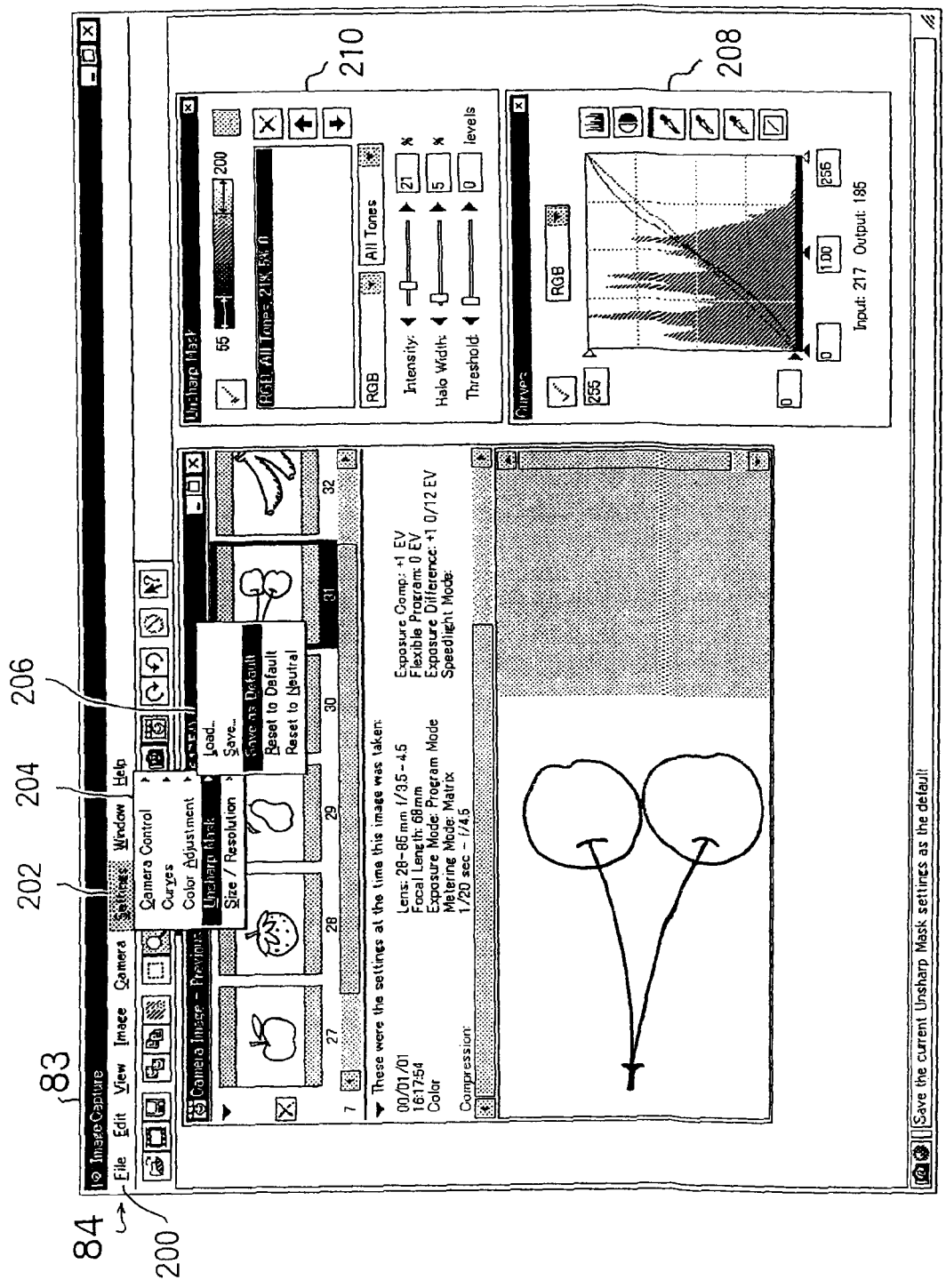
FIG. 12 shows a sub-window displayed to enable modification of the tone curve setting and the unsharp mask filter setting in the second embodiment.

In FIG. 12, an unsharp mask window 210 for changing the unsharp mask filter setting is displayed together with the tone curve window 208 in the window 83. The display areas of the pull-down menus 204 and 206 shown in FIG. 12 are shown in an enlargement in FIG. 13B.

Figure 13B:
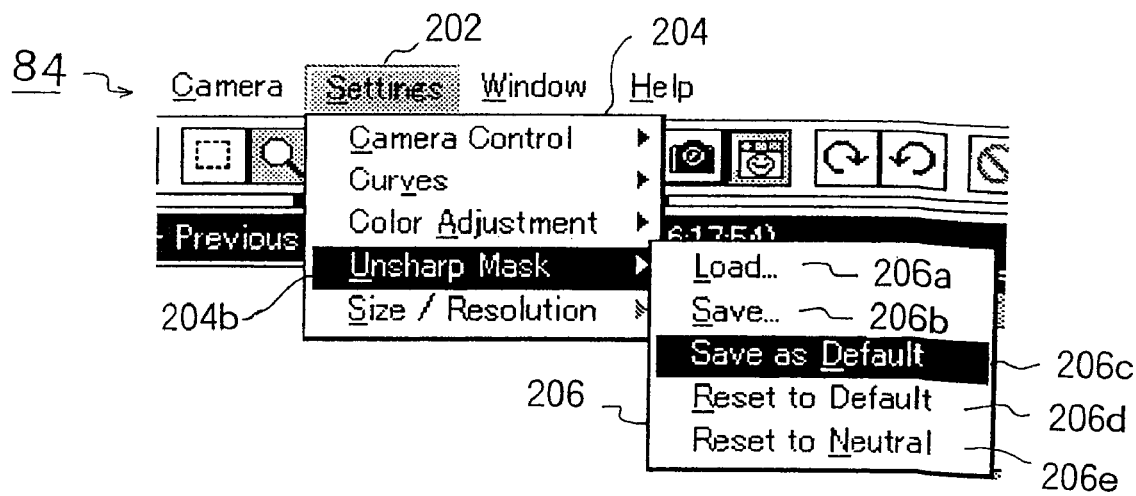
FIG. 13B shows in an enlargement the pull-down menu displayed in the screen shown in FIG. 12.

By clicking the item "Settings" 202 in the menu bar 84 in FIG. 13B, the pull-down menu 204 is brought up on display. When the cursor is placed on an item "Unsharp Mask" 204b in the pull-down menu 204, the pull-down menu 206 is brought up on display. By clicking the item "Load" 206a in the pull-down menu 206, the unsharp mask filter parameter setting saved to the HDD 52 (see FIG. 2) or the like is read out and displayed in the unsharp mask window 210 in FIG. 12. The user may change the unsharp mask setting by dragging an object displayed in the unsharp mask window 210 or by entering a new numerical value after clicking the box in which a numerical value is displayed.

The user may save the unsharp mask parameter setting thus modified by assigning a desired file name to it. Since the method of the operation performed for this purpose is similar to the method explained earlier in reference to FIGS. 11 and 13A with regard to the method for changing the tone curve setting and the like, its explanation is omitted. In addition, since the method of changing the unsharp mask setting and saving the new setting as the default value and a method of resetting the current setting to the default value or the original factory value are similar to those explained in reference to the tone curve setting, their explanation is omitted.

As explained above in reference to FIGS. 11-13, the processing conditions under which image data output from the electronic camera 2 are to be processed can be read out from the storage device such as the HDD 52 and new processing conditions can be saved to the HDD 52 or the like. The new processing conditions resulting from the change made by the user may be saved as the default processing conditions, i.e., the standard processing conditions, as well.

After the processing conditions are modified as described above, image data sequentially output by the electronic camera 2 are processed under the new processing conditions. As a result, when a photographing operation is performed under nearly constant photographing conditions, processing is implemented under the same processing conditions after an operation is performed to change the processing conditions to those corresponding to the photographing conditions. Thus, the user does not need to change the processing conditions each time a new set of image data is output from the electronic camera 2, which allows a large volume of image data to be processed within a relatively short period of time.

In addition, in the image processing apparatus in the embodiment, even if the current processing conditions are switched to the default processing conditions, the processing conditions in effect before the switch to the default processing conditions are held. Consequently, the processing conditions can be switched as necessary from the current processing conditions to the default processing conditions, or from the default processing conditions to the current processing conditions to process image data sequentially output from the electronic camera 2. This aspect of the embodiment is now explained in reference to FIGS. 3 and 14.

Figure 14:
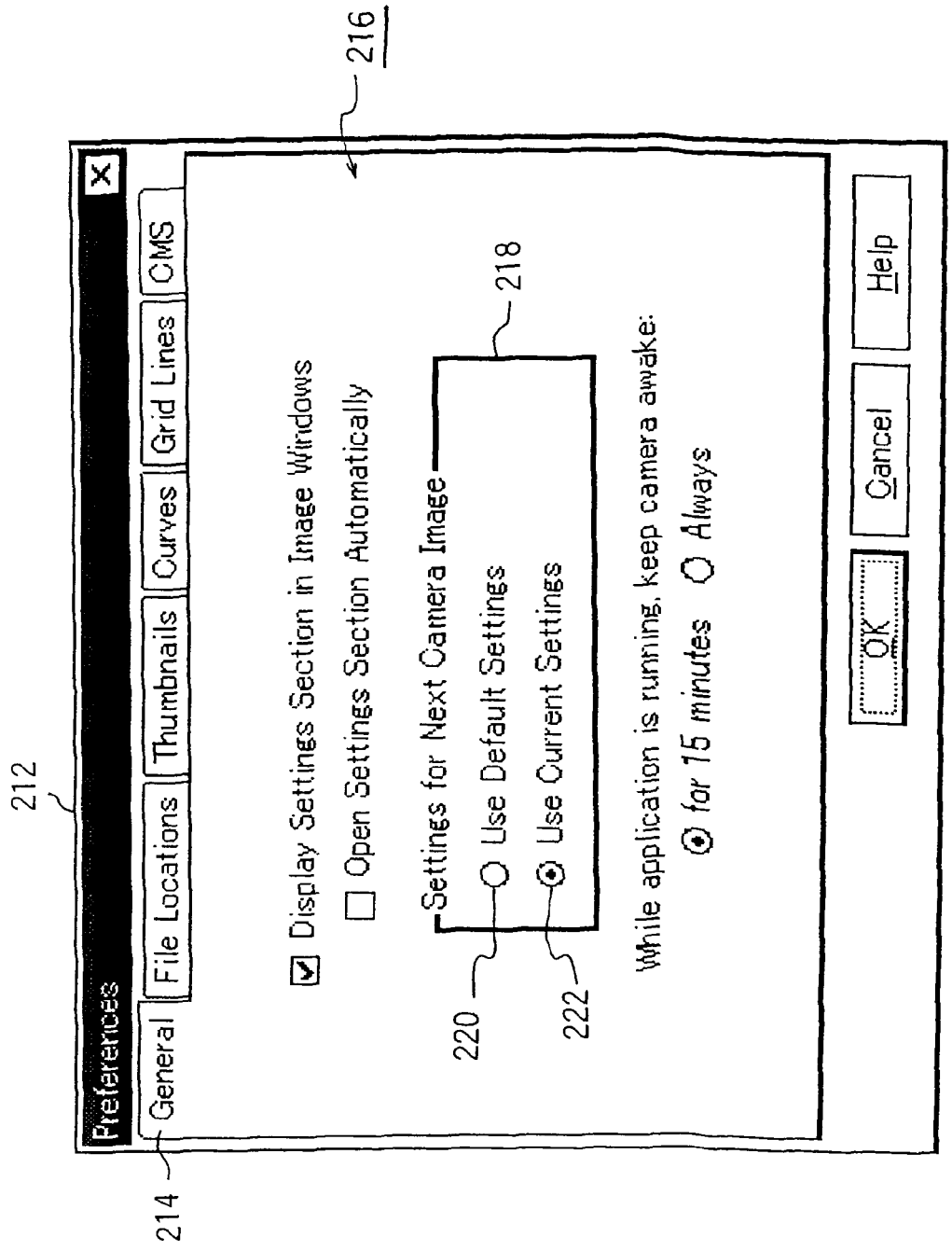
FIG. 14 shows the screen in which the processing conditions for image data to be subsequently input are set in the second embodiment.

By clicking an item "File" 200 (see FIG. 11) displayed in a task bar 84 in the window 83 in FIG. 3, a pull-down menu (not shown) is brought up on display. When and item "Preferences" (not shown) in this pull-down menu is clicked, a preference window 212 in FIG. 14 is displayed in the window 83. When the user clicks a tab "General" 214 in the preferences window 212, a menu 216 is brought up on display. A frame 218 assigned with a title "Settings for Next Camera Image" is displayed in the menu 216, with two option buttons 220 and 222 provided in the frame 218.

When the user clicks the option button 220, the default processing conditions are selected as the processing conditions for subsequent image data to be sequentially output from the electronic camera 2. If, on the other hand, the user clicks the option button 222, subsequent image data to be output from the electronic camera 2 are processed under the current processing conditions selected by the user through a setting change. The setting for the processing conditions can be switched any time by opening the preferences window 212.

Since the default processing conditions or the current processing conditions set by the user can be selected as the processing conditions for image data output from the electronic camera 2 as described above, image data can be processed with a high degree of efficiency as explained below.

For instance, lets us consider a situation in which the user mainly uses the electronic camera 2 for studio photographing. In this case, the processing conditions suited for images obtained through studio photographing are set as the default processing conditions. If it is temporarily used for outdoor photographing, processing conditions suited for image data obtained through outdoor photographing can be set. For instance, series of image data sequentially output from the electronic camera 2 may include image data obtained through studio photographing, image data obtained through outdoor photographing and image data obtained through studio photographing. Under such circumstances, processing can be implemented efficiently by switching to the default processing conditions, to the current processing conditions and then to the default processing conditions in correspondence to the image data sequentially output from the electronic camera 2.

Figure 15:
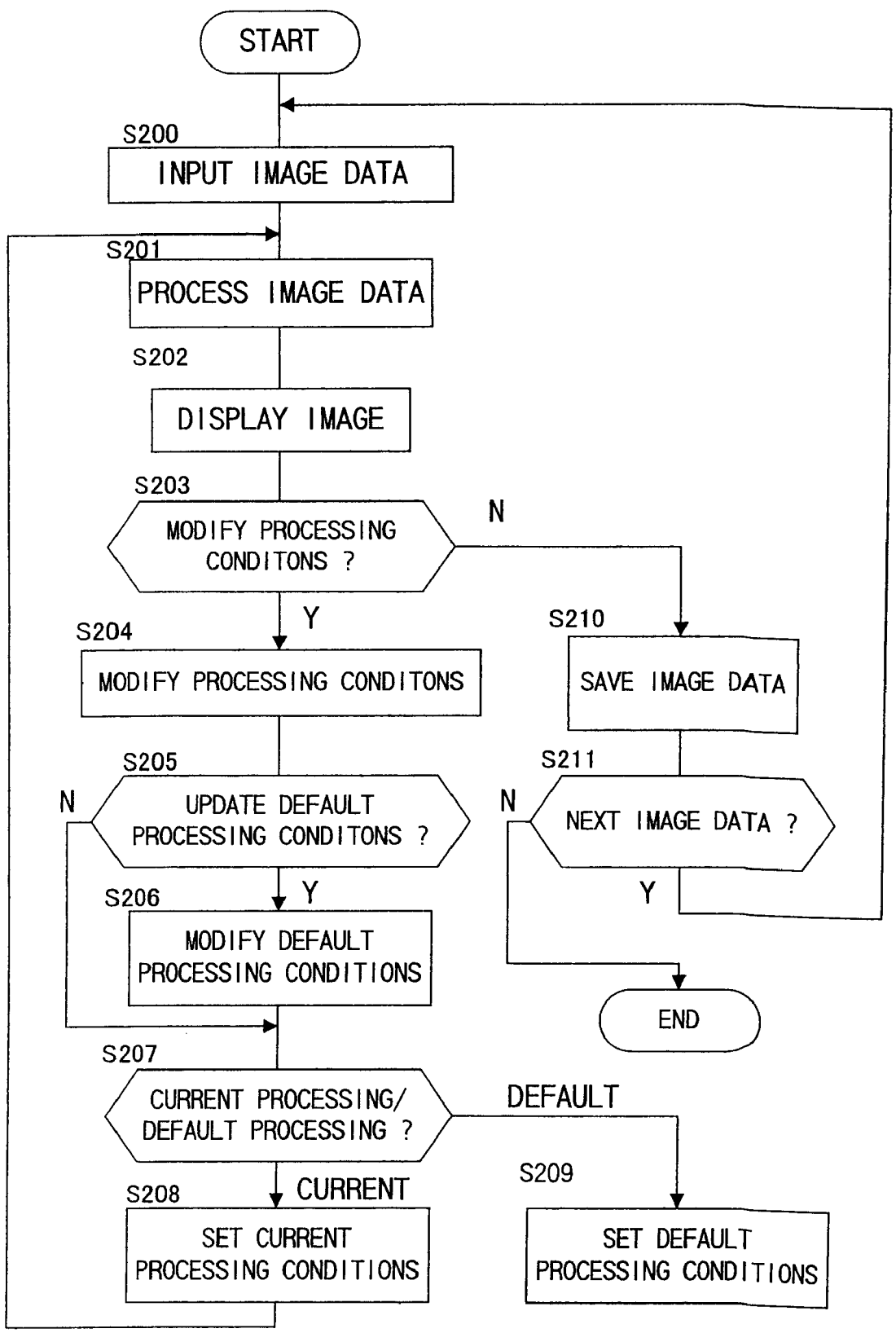
FIG. 15 is a flowchart of the image processing program executed in the image processing apparatus in the second embodiment.

FIG. 15 is a schematic flowchart of the information processing program used to executed by the CPU 40 in the computer 4 to implement the processing described above. This program, which is recorded in a recording medium such as the CD-ROM 54 or a floppy disk, is normally pre-installed in the hard disk drive 52 prior to the execution of the program by the CPU 40. Alternatively, the information processing program may be written in the ROM 44, an EEPROM (not shown) or the like. In addition, part of, or the entirety of the information processing program may be loaded from another computer or the like connected via a communication line or through a network, or part of, or the entirety of the information processing program may be down-loaded via the Internet or the like.

The information processing program executed as shown in the flowchart in FIG. 15 is now explained in reference to FIGS. 2, 3 and 11~14. This information processing program is executed after the camera image window 62 in FIG. 3 is activated.

The CPU 40 takes in image data output from the electronic camera 2 and temporarily records the image data in the temporary area of the RAM 42 or the HDD 52 shown in FIG. 2 in step S200. In step S201, the CPU 40 processes the image data under the preset current processing conditions and in the following step S202, it brings up an image corresponding to the processed image data on the display 6.

In step S203, the CPU 40 makes a decision as to whether or not an instruction to change the image data processing conditions has been issued by the user, and if a negative decision is made, the operation branches off to step S210, whereas if an affirmative decision is made, the operation proceeds to step S204. In step S204, the CPU 40 engages in processing for changing the image data processing conditions. The processing performed in steps S203 and 5204 described above corresponds to the tone curve modification processing and the unsharp mask filter setting change processing explained earlier in reference to FIGS. 11~13.

In step S205, the CPU 40 makes a decision as to whether or not an instruction for recording the modified processing conditions as new default processing conditions has been issued, and if an affirmative decision is made, the operation proceeds to step S206 to implement processing for changing the default processing conditions. If a negative decision is made in step S205, the CPU 40 branches the operation off to step S207. The processing performed in steps S205 and S206 described above corresponds to the processing performed when the item 206c in the pull-down menu 206 is clicked explained earlier in reference to FIG. 13.

In step S207, the CPU 40 makes a decision as to whether the current processing conditions or the default processing conditions are selected as the processing conditions for image data to be input after the execution of the processing in step S207. If it is decided in step S207 that the current processing conditions are selected, the CPU 40 proceeds to step S208 to set the current processing conditions as the processing conditions for the image data to be input subsequently. If, on the other hand, it is decided in step S207 that the default processing conditions are selected, the CPU 40 proceeds to step S209 to set the default processing conditions for subsequently input image data. The processing performed in steps S207~S209 corresponds to the processing implemented when the option button 220 or 222 is clicked explained earlier in reference to FIG. 14.

In step S210 to which the operation branches off if a negative decision is made in step S203, the CPU 40 saves the processed image data to a storage device such as the HDD 52. In the following step S211, the CPU 40 makes a decision as to whether or not the next set of image data has been input from the electronic camera 2, and if an affirmative decision is made, the operation returns to step S200 to repeat the processing described above. If a negative decision is made in step S211, the CPU 40 ends the execution of the image processing program explained above.

An explanation is given above in reference to the embodiment on an example in which individual sets of image data sequentially output from the electronic camera are checked one at a time to determine whether or not the processing conditions should be modified. Alternatively, procedures to be followed when processing image data output from the electronic camera may be programmed in advance or the processing conditions set by the user may be fixed to implement processing in a batch. For instance, if photographing conditions are known in advance, e.g., images in the first~tenth frames obtained through studio photographing, images in the eleventh~twenty fifth frames obtained through outdoor photographing and images in the twenty sixth through fiftieth frames obtained through studio photographing again, the processing conditions can be preprogrammed as described above. If it is known that images in all frames have been obtained under a single set of photographing conditions, they may be processed and saved under fixed processing conditions as described above.

While an explanation is given above in reference to the embodiment above on an example in which image data are output from the electronic camera 2 to the computer 4 constituting the image processing apparatus, another type of data may be input to the computer 4. For instance, audio data may be input. In addition, the electronic camera 2 may be a movie camera instead of a still camera.

Third Embodiment

Since the electronic camera is connected to the image processing apparatus in the third embodiment as shown in FIG. 1, which illustrates the first embodiment, illustration of the connection is omitted.

In FIG. 1, a display 6, a keyboard 8 and a mouse 10 are connected to a computer 4. The computer 4, the display 6, the keyboard 8 and the mouse 10 constitute the image processing apparatus in this embodiment and the image processing apparatus and the electronic camera 2 constitute the image input system in the embodiment. The camera 2 and the computer 4 are connected with each other as necessary via a cable 2A.

Image data generated through a photographing operation in the electronic camera 2 are output to the computer 4 via the cable 2A. Images can be checked by the user on the display 6. The image data input to the computer 4 undergo processing such as a color adjustment and an unsharp mask filter adjustment as necessary and then are output to and saved to a storage device such as a floppy disk, a hard disk or an MO (magneto-optical recording medium) drive.

In addition, through a user operation on the computer 4, an image processing parameter (the image processing parameter is to be explained in detail later) saved in the electronic camera 2 is read into the computer 4 where it is modified and the modified parameter is output to the electronic camera 2.

Since the internal structures of the electronic camera 2 and the computer 4 are as shown in FIG. 2 illustrating the first embodiment, their illustration is omitted.

In FIG. 2, the electronic camera 2 and the computer 4 are respectively provided with a connector 37 and a connector 38. One end of the cable 2A is detachably connected to the connector 37 whereas its other end is detachably connected to the connector 38.

The structure of the electronic camera 2 is now explained. A lens 12 is detachably mounted at the electronic camera 2. In addition, a flash memory 36 which is a nonvolatile storage device constituted as a memory card is detachably connected to the electronic camera 2 via a connector 34. It is to be noted that instead of the flash memory 36, an ultra small hard disk drive constituted as a card, a RAM card backed up by an internal battery or the like may be mounted.

Focusing control of the lens 12 is implemented by a CPU 28 via a lens control unit 14. In addition, an aperture unit 16 constituting an integrated part of the lens 12, too, is controlled by the CPU 28 via the lens control unit 14. The CPU 28 also controls the open/close operation of a shutter 18 so as to allow the shutter 18 to be opened when a CCD 20 receives subject light having been transmitted through the lens 12.

In the figure, a switch 24 represents a group of a plurality of switches, which includes a power switch, a recording/reproduction selector switch, a photographing mode selector switch, an exposure adjustment switch and a shutter release switch.

An EEPROM 25 is provided to record the adjustment constants used during the production of the electronic camera 2, the status information indicating the statuses during operation of the electronic camera 2, the image processing parameter or the like. It is to be noted that a volatile memory such as an SRAM may be utilized in place of the EEPROM 25 with a backup battery connected to the volatile memory. In such a case, the power for holding the memory contents in the volatile memory is normally supplied from a battery or the like mounted in the electronic camera 2. If no battery is mounted in the electronic camera 2, power for holding the memory contents is supplied from the backup battery to the volatile memory to hold the memory contents such as the adjustment constants.

The photographing mode and the exposure adjustment quantity set through the switch 24, the exposure values set as the shutter speed and the aperture value, the remaining battery power and the like are displayed on a mode display LCD 30. A monitor LCD 32 is utilized for the reproduction of a photographed image, image data histogram display and the like.

When the user performs a shutter release operation, the shutter 18 opens/closes. At this time, the subject light having been transmitted through the lens 12 forms a subject image on the light-receiving surface of the CCD 20. The CCD 20 outputs an image signal corresponding to the subject image to an ASIC 22. A RAM 26 is connected to the ASIC 22. The RAM 26, which is also connected with the CPU 28, can be accessed from the CPU 28. The ASIC 22 generates image data by processing the image signal and temporarily saves the image data in the RAM 26. The ASIC 22 implements a preset type of processing on the image data and records the processed image data in the flash memory 36. Alternatively, the image data having been processed by the ASIC 22 may be output to the computer 4. Furthermore, the image data processing mentioned above may be implemented by the CPU 28 instead of the ASIC 22, or the image data processing job may be shared by the ASIC 22 and the CPU 28.

During the image data processing described above, the image processing parameter recorded in the EEPROM 25 is referenced. Since the EEPROM access speed is normally low, it is desirable to read out the image processing parameter from the EEPROM 25 and record it in the RAM 26 in advance.

The structure of the computer 4 is now explained. A RAM 42 and a ROM 44 are connected to a CPU 40 constituting the core of the computer 4. In addition, a CD-ROM drive 53, a hard disk drive (HDD) 52, a floppy disk drive (FDD) 50, an MO drive 48 and the like are connected to the CPU 40 via an interface (I/F) 46.

The CPU 40 takes in an image signal a output by the electronic camera 2, temporarily records it in a temporary area at the RAM 42 or the HDD 52 and displays thumbnail images, a detailed image and attached information related to the detailed image on the display 6 as detailed later. By operating the mouse 10 or the keyboard 8, the user implements processing such as an image data color tone adjustment, a contrast adjustment or an unsharp mask filter adjustment. The image data that are ultimately obtained after the processing are output to and saved at a storage device such as the HDD 52, the FDD 50 or the MO drive 48.

The computer 4 engages in display, processing and storage of the image data output from the electronic camera 2 as described above. In addition, the computer 4 is capable of reading out the image processing parameter recorded in the EEPROM 25 of the electronic camera 2, modifying it and writing it into the electronic camera 2 as explained in detail below.

In the following explanation, the LUT for modifying image gradation characteristics (hereafter in the specification, it is referred to as the "gradation LUT") is exchanged between the electronic camera 2 and the computer 4 as an image processing parameter.

The gradation LUT is referenced to ascertain the gradation value of image data having undergone adjustment processing that corresponds to the gradation value of the image data yet to undergo the adjustment processing. This gradation LUT may assume, for instance, the data structure illustrated in FIG. 16B, with the post-adjustment processing (output) gradation values recorded as 0, 0, 1, 1, . . . in correspondence to the pre-adjustment processing (input) gradation values 0, 1, 2, 3, . . . . The gradation LUT is normally recorded in the EEPROM 25 of the electronic camera 2 shown in FIG. 2. When power to the electronic camera 2 is turned on, the CPU 28 reads out of the gradation LUT from the EEPROM 25 and temporarily records it in the RAM 26. The ASIC 22 implements processing such as interpolation on an image signal output from the CCD 20 to generate image data and temporarily records the image data in the RAM 26. The ASIC 22 then implements gradation adjustment processing on these image data by referencing the gradation LUT recorded in the RAM 26.

As explained earlier, the gradation LUT can be read from the electronic camera 2 into the computer 4 and then can be written back to the electronic camera 2 after the user modifies it. When the user modifies the gradation LUT, it is difficult for the user to intuitively ascertain the specific gradation adjustment characteristics that the gradation LUT may have even when the data array, as shown in FIG. 16B, is displayed on the display 6. Accordingly, the gradation adjustment characteristics of the gradation LUT are graphically displayed on the display 6, as illustrated in FIG. 17.

Figure 17:
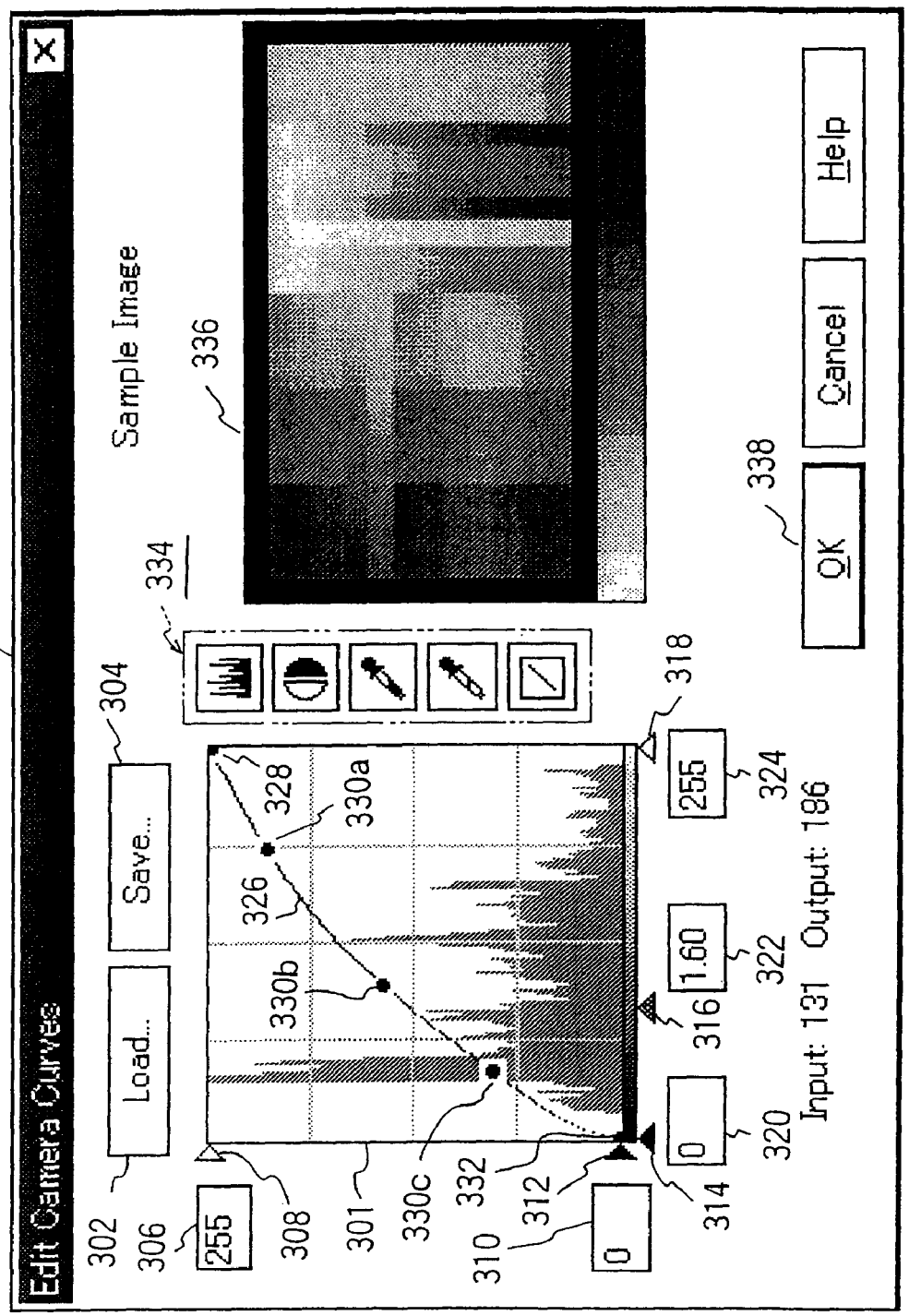
FIG. 17 presents an example of a sub-window displayed by the image processing apparatus when displaying/modifying the image processing parameter.

A window "Edit Camera Curves" 300 (hereafter simply referred to as the "window 300") in FIG. 17 is brought up on the display 6 by the user by operating the keyboard 8 or the mouse 10. It is to be noted that in the following explanation, placing the cursor at the position of an object displayed in the window 300 by operating the mouse 10 and pressing the left button of the mouse 10 once is referred to as "clicking" and placing the cursor on the object and moving the mouse 10 along a specific direction on the mousepad while holding down the left button of the mouse 10 is referred to as "dragging."

A curve 326 in a graph 301 on the left-hand side in FIG. 17 is referred to as a tone curve. By viewing the shape of the curve 326, the user is able to intuitively ascertain the gradation LUT characteristics. A sample image 336 used to estimate in advance the specific image obtained through the gradation adjustment implemented in conformance to the tone curve is displayed on the right side of the window 300. While the gradation pattern is displayed in the example presented in FIG. 17, details of the sample image display can be modified by the user freely.

The curve 326 is obtained by interpolating the intervals between points 328, 330a, 330b, 330c and 332 in conformance to a spline curve. The plotting positions for the points 328, 330a, 330b, 330c and 332 can be set by the user, as explained below. In the graph in which the curve 326 is drawn, the horizontal axis (X axis) represents the input value (pre-adjustment gradation value) and the vertical axis (Y axis) represents the output value (post-adjustment gradation value). If no gradation adjustment is implemented, the curve 326 becomes a straight line satisfying Y=X. In the following explanation, the pre-adjustment gradation value is referred to as the "input value" and the post-adjustment gradation value is referred to as the "output value." In addition, while an example in which the image data have 8-bit gradation, i.e., 256 gradations, is explained in reference to FIG. 17, the present invention may be adopted when the number of gradations is smaller than 256 or when the number exceeds 256.

In the periphery of the graph, boxes 306, 310, 320, 322 and 324, and sliders 308, 312, 314, 316 and 318, the settings at which can be modified through the keyboard 8 or the mouse 10 are provided. By operating the mouse 10 and dragging the slider 308 along the Y axis, the user can set the upper limit of the output value. The upper limit of the output value may be also set by entering a numerical value through the keyboard 8 after clicking the box 306. The lower limit of the output value is set in a similar manner. Namely, it may be sent either by dragging the slider 312 along the Y axis or by entering a numerical value through the keyboard 8 after clicking the box 310. These upper and lower limits are set so as to ensure that any image printed through DTP of the like does not manifest an excessive whitening phenomenon or an excessive blackening phenomenon.

The sliders 314 and 318 near the X axis are provided to select the values to be shadowed and highlighted from the pre-adjustment image data gradation. By dragging the slider 314 along the X axis or by entering a numerical value through the keyboard 8 after clicking the box 320, the user can set the shadow level. In addition, by dragging the slider 318 along the X axis or by entering a numerical value through the keyboard 8 after clicking the box 324, the user can set the highlight level. The slider 316 is provided to determine the gamma setting for the image. By dragging the slider 316 along the X axis or by entering a numerical value through the keyboard 8 after clicking the box 322, the user can set the gamma characteristics of the mid-tone range of the image to be represented as a relatively steep inclination or set them to be represented as a relatively gentle inclination.

The highlight, shadow and mid-tone adjustments explained above can also be implemented by clicking specific objects among the five objects 334 shown in FIG. 17.

The points 328 and 332 in the graph 301 are automatically plotted in conformance to the details of the upper limit and lower limit settings for the output value and the highlight and shadow settings for the input value. The number of the remaining points, i.e., the points 330*a*, 330*b* and 330*c*, may be fewer than three or more than three depending upon user preference. In addition, the positions of the individual points, too, can be freely moved along the vertical direction and the horizontal direction in FIG. 17 through a dragging operation.

The number of points may be increased by moving the cursor to the position where the user wishes to create a new point and clicking at that position. A point may be erased by placing the cursor on the point to be erased and dragging the point to the outside of the graph 301.

As the number of points displayed in the graph is increased/decreased as described above, a curve 326 achieved by interpolating these points in conformance to a spline curve is displayed. In this state, the user performs a dragging operation to move the point and change the shape of the curve 326, which results in a change in the gradation characteristics. In correspondence to the change in the gradation characteristics, the gradation of a sample image 336, too, changes. While checking the sample image 336, the user adjusts the number of points and their positions. Based upon the results of the processing performed as described above, a gradation LUT, which reflects the user preferences is created through spline interpolation. It is to be noted that the bar graph shown at low contrast in the graph 301 in FIG. 17 represents the gradation histogram of the sample image 336. The user may refer to this histogram while engaging in the operation described above.

The data structure of the image processing parameter generated as described above is explained in reference to FIGS. 16A and 16B. FIGS. 16A and 16B present an example of the concept of the data structure of the image processing parameter input/output between the electronic camera 2 and the computer 4. The data structure of the image processing parameter incorporates the header information shown in FIG. 16A and the LUT shown in FIG. 16B. The header information in FIG. 16A is constituted of the number of points plotted in the graph 301 in FIG. 17, their coordinate values and the like. In other words, it is constituted of information with regard to the control points that are referenced when generating a characteristics curve for the graph 301 through an interpolation operation. The LUT in FIG. 16B is an aggregate of data generated by the CPU 40 at the computer 4 based upon the control point information. In the EEPROM 25 of the electronic camera 2, the data in both FIGS. 16A and 16B are recorded as image processing parameters.

The flow of the processing performed to read an image processing parameter recorded in the EEPROM 25 of the electronic camera 2 into the computer 4, modify the parameter on the computer 4 and write the modified parameter back into the EEPROM of the electronic camera 2 is explained in reference to FIGS. 16~19. It is to be noted that the characteristics curve graph 301 displayed in the window 300 in FIG. 17 alone is shown in FIGS. 18 and 19.

Figure 18A:
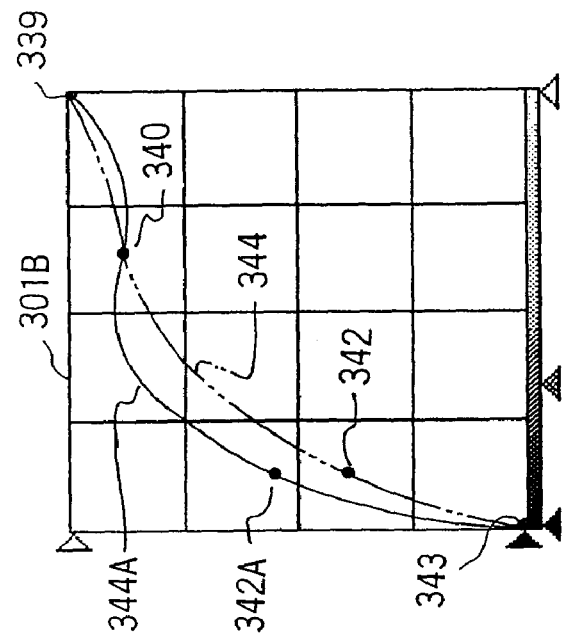
FIGS. 18A and 18B illustrate how the image processing parameter input from the electronic camera is displayed and modified in the image processing apparatus in the third embodiment.

With the electronic camera 2 connected to the computer 4, the user starts up the window 300 shown in FIG. 17 and clicks the "Load" button 302. In response, the image processing parameter recorded in the EEPROM 25 of the electronic camera 2 is output to the computer 4 and is temporarily saved in the RAM 42. Based upon the image processing parameter, points 339, 340, 342 and 343 and a curve 344 are displayed in a graph 301A as shown in FIG. 18A, for instance. The user is able to intuitively ascertain the shape of the characteristics curve of the image processing parameter set in the electronic camera 2 by looking at the graph 301A. The curve 344 drawn in the graph 301A has been obtained through spline interpolation by using the header information mentioned earlier. In other words, the curve 344 has not been created by plotting the LUT data shown in FIG. 16B.

The user modifies the profile of the characteristics curve in FIG. 18A through the mouse 10. For instance, by moving the position of the point 342 to the position of a point 342A in FIG. 18B, the shape of the tone curve changes from that of the curve 344 to that of a curve 344A. Since the pre-adjustment control point information is recorded in the electronic camera 2, the pre-adjustment characteristics curve can be reproduced and fine modifications can be made on the characteristics curve with great ease. If the header information (control point information) shown in FIG. 16A is not recorded in the electronic camera 2, described earlier in reference to the prior art, a characteristics curve can only be reproduced based upon the LUT data. An instance of this is now explained in reference to FIGS. 19A and 19B.

Figure 18B:
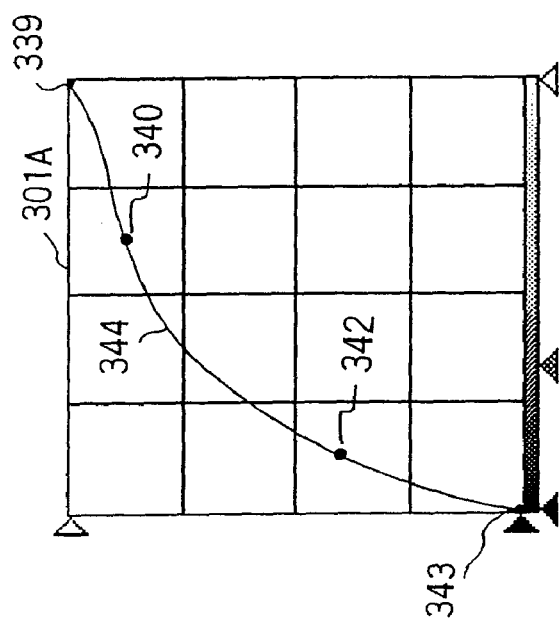
Figure 19A:
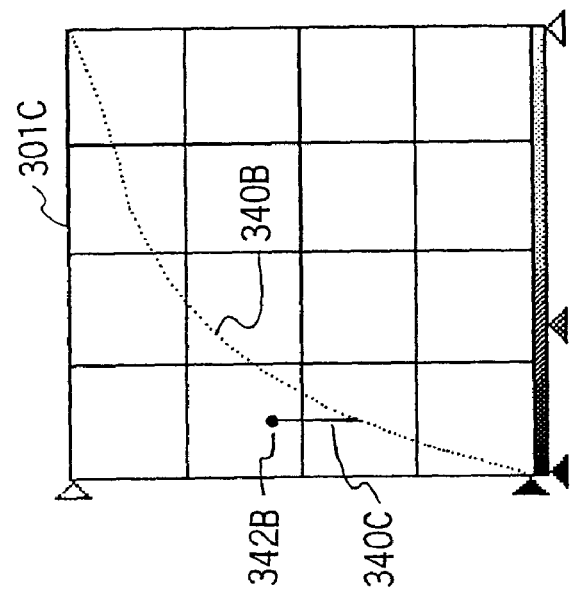
FIGS. 19A and 19B illustrate an example in which an image processing parameter cannot be modified as desired in an information processing apparatus in the prior art.
Figure 19B:
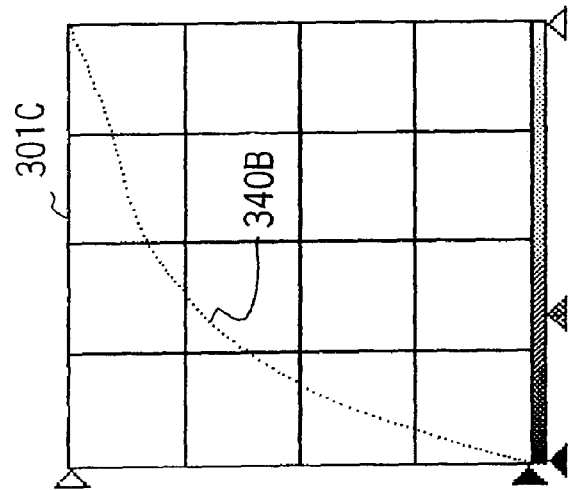

FIG. 19A presents an example in which a curve 340B is reproduced based upon the LUT data. In this case, the information on the control points 339, 340, 342 and 343 shown in FIG. 18A has been lost. The curve 340B has been reproduced based upon the LUT data. In other words, it has been reproduced based upon 256 sets of control point information. An interpolation curve obtained through spline interpolation passes through all the control points. Thus, even when an operation identical to that explained in reference to FIG. 18B is performed on the curve 340B in FIG. 19A, the outcome is completely different, as shown in FIG. 19B, since the shape of the curve 340B has been fixed in conformance to the other 255 control points. In other words, even when an operation identical to that explained in reference to FIG. 18B is performed on the curve 340B in FIG. 19A, the overall shape of the curve 340B hardly changes, as shown in FIG. 19B, with the shape of a very small portion 340C of the curve 340B having undergone a change.

When the operation described earlier is completed, the user clicks the "Save" button 304 in the window 300 in FIG. 17. In response, a new LUT is generated in the computer 4 based upon the new control point information. Then, the new control point information as well as the new LUT data is output from the computer 4 to the electronic camera 2 to be recorded into the EEPROM 25.

An explanation is given above on an example in which the control point information as well as the LUT is transferred both when the image processing parameter is output from the computer 4 to the electronic camera 2 and when the image processing parameter is output from the electronic camera 2 to the computer 4. Instead, when outputting the image processing parameter from the electronic camera 2 to the computer 4, the control point information alone may be transferred. In such a case, a reduction in the length of time required for communication between the electronic camera 2 and the computer 4 is achieved.

Moreover, an LUT may be generated by exchanging the control point information alone between the electronic camera 2 and the computer 4 and performing an interpolation operation both at the electronic camera 2 and the computer 4 based upon the control point information. However, since the resources such as the memory for saving programs and the like are limited in the electronic camera 2, it is often difficult to generate an LUT through the interpolation operation described above at the electronic camera 2. For this reason, it is more realistic to exchange the header information (control point information) together with the LUT data between the electronic camera 2 and the computer 4 as described above.

The image processing parameter exchange processing procedure executed by the CPU 40 of the computer 4 to output the image processing parameter from the electronic camera 2 to the computer 4, modify the image processing parameter on the computer 4 and output the modified image processing parameter from the computer 4 to the electronic camera 2 as described above is explained in reference to FIG. 20.

FIG. 20 is a schematic flowchart of the image processing parameter exchange program executed by the CPU 40 of the computer 4 to implement the processing described above. This program, which is recorded in a recording medium such as the CD-ROM 54 or a floppy disk, is normally pre-installed in the hard disk drive 52 prior to the execution of the program by the CPU 40. Alternatively, the information processing program may be written in the ROM 44, an EEPROM (not shown) or the like. In addition, part of, or the entirety of the information processing program may be loaded from another computer or the like connected via a communication line or through a network, or part of, or the entirety of the information processing program may be down-loaded via the Internet or the like.

The image processing parameter exchange program in the flowchart in FIG. 20 is explained in reference to FIGS. 2 and 16~19. The execution of this image processing parameter exchange program is started by the user by selecting a menu for image processing parameter update while executing a program for displaying the image data input from the electronic camera 2 in FIG. 2 on the display 6 or saving it to the HDD 52.

In step S300, the CPU 40 displays a sub-window, i.e. the window 300 in FIG. 17, on the display 6. In step S301, the CPU 40 makes a decision as to whether or not an instruction for image processing parameter input has been issued. In other words, it makes a decision as to whether or not the "Load" button 302 in FIG. 17 has been clicked, and if a negative decision is made, the operation branches off to step S304, whereas the operation proceeds to step S302 if an affirmative decision is made. In step S302, the CPU 40 takes in the image processing parameter from the electronic camera 2. In other words, it takes in the header information in FIG. 16A and the LUT data in FIG. 16B.

After generating the characteristics curve 326 based upon the control point information through spline interpolation and displaying the characteristics curve 326 on the graph 301 in FIG. 17 in step S303, the CPU 40 returns to step S301.

In step S304 to which the operation branches off if a negative decision is made in step S301, the CPU 40 makes a decision as to whether or not an instruction for image processing parameter modification has been issued. In other words, the CPU 40 makes a decision as to whether or not the slider 308, 312, 314, 316, or 318 provided in the periphery of the graph 301 in FIG. 17 has been dragged whether or not the point (control point) 330a, 330b or 330c has been dragged or whether or not a new control point has been added. If a negative decision is made in step S304, the CPU 40 branches the operation off to step S307, whereas if an affirmative decision is made in step S304, the operation proceeds to step S305.

In step S305, the CPU 40 implements the image processing parameter modification processing in correspondence to the contents of the user operation described above, and in the following step S306, it generates a new LUT by performing an interpolation operation based upon the new control point information. When the processing described above is completed, the CPU 40 returns to step S301.

In step S307 to which the operation branches off if a negative decision is made in step S304, the CPU 40 makes a decision as to whether or not an instruction for image processing parameter output has been issued. Namely, the CPU 40 makes a decision as to whether or not the "Save" button 304 in FIG. 17 has been pressed, and if a negative decision is made, the operation branches off to step S309, whereas the operation proceeds to step S308 if an affirmative decision is made. In step S308, the CPU 40 engages in image processing parameter output processing. In other words, the CPU 40 outputs the new LUT data together with the new header information to the electronic camera 2. When the processing in step S308 is completed, the CPU 40 returns to step S301.

In step S309 to which the operation branches off if a negative decision is made in step S307, the CPU 40 makes a decision as to whether or not an instruction to end the image processing parameter modification processing has been issued. Namely, a decision is made as to whether not an "OK" button 338 in FIG. 17 has been clicked, and the operation returns to step S301 if a negative decision is made, whereas the operation proceeds to step S310 if an affirmative decision is made to end the display of the window 300 in FIG. 17 and end the processing performed in conformance to the image processing parameter exchange program.

While an explanation is given above in reference to the embodiment in which the image processing parameter to be modified is the tone curve, the present invention may be adopted to modify parameters other than the tone curve. In addition, it may be adopted to modify the combination of the shutter speed and the aperture determined in correspondence to the subject brightness ascertained through a photometering operation performed in the electronic camera 2, i.e., to modify control parameters such as a program curve or the like in auto-xposure.

The image input apparatus connected to the computer 4 may be a scanner or the like instead of an electronic camera. In addition, the electronic camera may be a movie camera instead of a still camera. An audio apparatus, a measuring apparatus or the like that inputs/outputs audio signals or other electrical signals may be connected to the computer 4. For instance, if an audio apparatus or the like is connected to the computer 4, processing parameters related to the equalizer characteristics and the like of the audio input apparatus can be exchanged between the computer 4 and the audio input apparatus.

The image processing parameter explained in reference to the embodiment may be recorded in the HDD 52 or the like at the computer 4. For instance, a plurality of image processing parameters may be recorded in the HDD 52 or the like to output a set of or a plurality of sets of image processing parameters among these recorded image processing parameters to the electronic camera 2 in correspondence to the purpose of a given photographing operation. By recording a plurality of image processing parameters in the electronic camera 2, it becomes possible to modify an image processing parameter even without the computer 4.

While an explanation is given above on an example in which the electronic camera 2 and the computer 4 are connected through the cable 2A, they may be connected through a wireless connection via light beams or radio. This principle applies in the other embodiments described earlier. In addition, an image processing parameter generated on the computer 4 may be recorded in a flash memory card mounted at a flash memory adapter (not shown) connected to the computer 4 and the flash memory card may be then mounted at the electronic camera 2. Through this method, too, the image processing parameter can be exchanged between the electronic camera 2 and the computer 4.

An explanation is given above on an example in which a characteristics curve for defining the look-up table conversion characteristics is obtained by using a spline function based upon a specific number of sets of control point information. However, according to the present invention, another function such as a Bezier function a NURBS (Non-Uniform Rational B-Spline) function or the like.

What is claimed is:

1. A method of exchanging between devices information related to a look-up table that is referenced in order to obtain a post-adjustment processing image data value corresponding to pre-adjustment processing image data value, comprising:
exchanging at least a plurality of control points between an image input apparatus and an information processing apparatus, which is an external device of the image input apparatus, the control points, in combination with an interpolation operation, specifying a characteristics curve that defines conversion characteristics of a look-up table;
the exchanging comprising,
outputting the control points from the image input apparatus to the information processing apparatus,
receiving adjustments of the control points in the information processing apparatus from a user and generating the look-up table, based on the adjusted control points, and
outputting the adjusted control points and the generated look-up table from the information processing apparatus to the image input apparatus; and
converting the pre-adjustment processing image data value to the post-adjustment processing image data value with reference to the look-up table received by the image input apparatus.

2. A method according to claim 1, wherein
data of the look-up table is exchanged together with the plurality of control points.

3. A method according to claim 1, wherein
the look-up table is referenced to modify gradation characteristics of an image of the image data.

4. A method according to claim 1, wherein
the image input apparatus is an digital camera.

5. An image input apparatus comprising:
an image processing device that performs image processing on an input image by referencing a look-up table;
a storage device that stores a plurality of control points, the control points, in combination with an interpolation operation specifying a characteristics curve for defining conversion characteristics of the look-up table;
a control device that inputs or outputs, at least the control points when there is a request from an external device to input or output information related to the look-up table; and
a communication interface that communicates with the external device, wherein
the control device inputs or outputs the control points through the communication interface,
the control device outputs the control points to the external device from the image input apparatus through the communication interface and receives the control points and the look-up table from the external device through the communication interface, and
the input image is processed with reference to the received look-up table by the image processing device.

6. An image input apparatus according to claim 5, wherein
the look-up table is referenced to modify gradation characteristics of the input image.

7. An image input apparatus according to claim 5, wherein
the image input apparatus is a digital camera.

8. An information processing apparatus, comprising:
a look-up table generating device that generates a characteristics curve for defining conversion characteristics of a look-up table by applying an interpolation operation to a plurality of control points;
a control device that outputs, at least the control points when outputting information related to the look-up table to an image processing device that performs image processing on an input image by referencing the look-up table, and that inputs, at least the control points when inputting the information related to the look-up table from the image processing device; and
a communication interface that communicates with the image processing device, wherein
the control device inputs and outputs the control points through the communication interface,
the control device inputs the control points from the image processing device through the communication interface, and
the information processing apparatus further comprises:
a look-up table generating device that generates an adjusted control point and the look-up table, based on instructions of adjustments of the control point from a user, and
the control device outputs the adjusted control point and the generated look-up table to the image processing device through the communication interface.

9. An information processing apparatus according to claim 8, wherein
the control device inputs and outputs data of the look-up table together with the plurality of control points.

10. An information processing apparatus according to claim 8, wherein
the look-up table is referenced to modify gradation characteristics of the input image.

11. An information processing apparatus according to claim 8, wherein
the image processing device is a digital camera.

12. An information input system, comprising:
an information processing apparatus that generates a look-up table, the look-up table referenced to obtain a post-adjustment processing image data value corresponding to a pre-adjustment processing image data value; and
an image input apparatus that performs adjustment processing on image data obtained from an input image by referencing the look-up table, wherein:
the information processing apparatus outputs control points that, in combination with an interpolation operation, generate a characteristic curve for defining conversion characteristics of the look-up table, to the image input apparatus; and
the image input apparatus outputs, at least, the control points to the information processing apparatus.

13. An information input system according to claim 12, wherein:
the information processing apparatus outputs the control points together with data of the look-up table to the image input apparatus; and
the image input apparatus outputs the control points together with data of the look-up table to the information processing apparatus.

14. An information input system according to claim 12, wherein
the look-up table is referenced to modify gradation characteristics of the input image.

15. A non-transitory computer readable medium storing a control program that causes an image input apparatus to perform a method comprising:
outputting control points that, in combination with an interpolation operation, generate a characteristics curve for defining conversion characteristics of a look-up table to an external device from the image input apparatus through a communication interface that communicates with the external device, when there is a request from the external device to output information related to the look-up table;
inputting the control points and the look-up table from the external device through the communication interface; and
processing the input image with reference to the inputted look-up table by an image processing device.

16. A non-transitory computer readable medium according to claim 15, wherein
the look-up table is referenced to modify gradation characteristics of the input image.

17. A non-transitory computer readable medium according to claim 15, wherein
wherein the image input apparatus is a digital camera.

18. A non-transitory computer readable medium storing a control program that causes an information processing apparatus to perform a method comprising:
inputting control points from an image processing device that performs image processing on an input image by referencing a look-up table through a communication interface that communicates with the image processing device;
generating an adjusted control point and the look-up table by applying an interpolation operation to a plurality of control points, based on instructions of adjustments of the control point from a user; and
outputting the adjusted control point and the generated look-up table to the image processing device through the communication interface.

19. A non-transitory computer readable medium according to claim 18, wherein
data of the look-up table is output and input together with the plurality of control points.

20. A non-transitory computer readable medium according to claim 18, wherein
the look-up table is referenced to modify gradation characteristics of the input image.

21. A non-transitory computer readable medium according to claim 18, wherein
wherein the image processing device is a digital camera.

* * * * *